(12) United States Patent
Tsuda

(10) Patent No.: US 8,917,237 B2
(45) Date of Patent: Dec. 23, 2014

(54) INFORMATION PROCESSING SYSTEM, INFORMATION PROCESSING APPARATUS, STORAGE MEDIUM HAVING INFORMATION PROCESSING PROGRAM STORED THEREON, AND CONTENT PLAYBACK CONTROL METHOD

(75) Inventor: Munetaka Tsuda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 212 days.

(21) Appl. No.: 13/457,148

(22) Filed: Apr. 26, 2012

(65) Prior Publication Data

US 2012/0306739 A1 Dec. 6, 2012

(30) Foreign Application Priority Data

Jun. 3, 2011 (JP) ................................. 2011-125865

(51) Int. Cl.
*G09G 5/00* (2006.01)
*H04N 21/432* (2011.01)
*H04N 21/41* (2011.01)
*H04N 21/414* (2011.01)

(52) U.S. Cl.
CPC ....... *H04N 21/4325* (2013.01); *H04N 21/4122* (2013.01); *H04N 21/41407* (2013.01)
USPC ........................ 345/156; 361/679.21; 348/734

(58) Field of Classification Search
CPC ... G06F 3/048; G06F 3/1423; G09G 2354/00; H04N 21/4126; H04N 21/4325; H04N 21/4122; H04N 21/41407

USPC ............ 345/156, 157, 168, 173; 361/679.04, 361/679.21; 463/36, 37; 715/864
See application file for complete search history.

(56) References Cited

U.S. PATENT DOCUMENTS

| | | | | |
|---|---|---|---|---|
| 5,831,664 | A | * | 11/1998 | Wharton et al. ................. 725/81 |
| 6,028,602 | A | * | 2/2000 | Weidenfeller et al. ......... 715/781 |
| 2002/0067338 | A1 | * | 6/2002 | Adan et al. ..................... 345/156 |
| 2002/0154888 | A1 | | 10/2002 | Allen et al. |
| 2004/0032400 | A1 | * | 2/2004 | Freeman et al. .............. 345/173 |
| 2004/0075641 | A1 | * | 4/2004 | Widdowson .................. 345/156 |
| 2005/0110909 | A1 | * | 5/2005 | Staunton et al. ............... 348/734 |
| 2005/0174489 | A1 | | 8/2005 | Yokoyama et al. |
| 2006/0253797 | A1 | * | 11/2006 | Madan et al. ................. 715/792 |

(Continued)

FOREIGN PATENT DOCUMENTS

| | | |
|---|---|---|
| JP | 2003-333359 | 11/2003 |
| JP | 2006-11358 | 1/2006 |

(Continued)

OTHER PUBLICATIONS

Dec. 4, 2012 Search Report for EP 12166659.8, 6 pages.

(Continued)

*Primary Examiner* — Tom Sheng
(74) *Attorney, Agent, or Firm* — Nixon & Vanderhye PC

(57) ABSTRACT

An example information processing system includes a stationary display device, and a portable display device on which a predetermined input can be made by a user. A content item is played and displayed on the stationary display device, and while the content item is being played, the playback image of the content item and a user interface image used for specifying a content item to be played are selectively displayed on the portable display device.

17 Claims, 17 Drawing Sheets

(56) References Cited

U.S. PATENT DOCUMENTS

| | | |
|---|---|---|
| 2007/0290876 A1 | 12/2007 | Sato et al. |
| 2008/0168514 A1* | 7/2008 | Jeon ............................ 725/110 |
| 2008/0284907 A1* | 11/2008 | Chiao .......................... 348/448 |
| 2008/0287191 A1* | 11/2008 | Hsiao et al. ..................... 463/42 |
| 2009/0150553 A1* | 6/2009 | Collart et al. ................. 709/229 |
| 2010/0250816 A1* | 9/2010 | Collopy et al. ............... 710/303 |
| 2010/0293598 A1* | 11/2010 | Collart et al. ..................... 726/3 |
| 2011/0181780 A1* | 7/2011 | Barton ......................... 348/563 |
| 2012/0066643 A1* | 3/2012 | McRae ......................... 715/810 |
| 2012/0117511 A1* | 5/2012 | Agnihotri et al. ............. 715/810 |
| 2012/0162536 A1* | 6/2012 | Sibilsky et al. ............... 348/734 |
| 2012/0311633 A1* | 12/2012 | Mandrekar et al. ............. 725/40 |
| 2012/0324512 A1* | 12/2012 | Cahnbley et al. ............... 725/53 |

FOREIGN PATENT DOCUMENTS

| | | |
|---|---|---|
| JP | 2007-184745 | 7/2007 |
| JP | 2009-55614 | 3/2009 |
| JP | 2010-217229 | 9/2010 |
| WO | 00/72596 | 11/2000 |
| WO | 2005/036325 | 4/2005 |

OTHER PUBLICATIONS

WII Channel, Internet Channel, URL:http://www.nintendo.co.jp/wii/features/internet/, and English-language Translation, 5 pages.

* cited by examiner

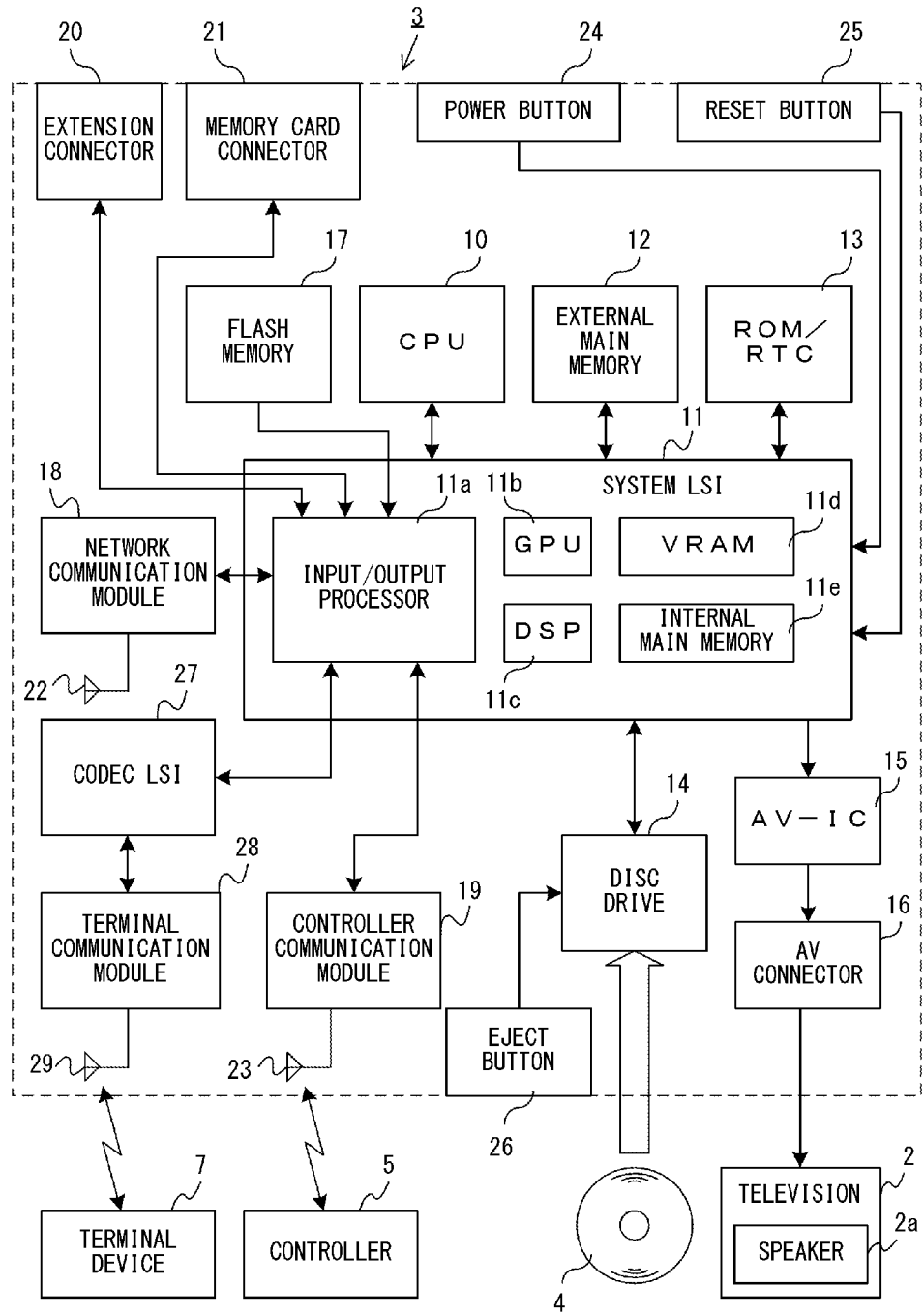
F I G. 2

F I G. 9
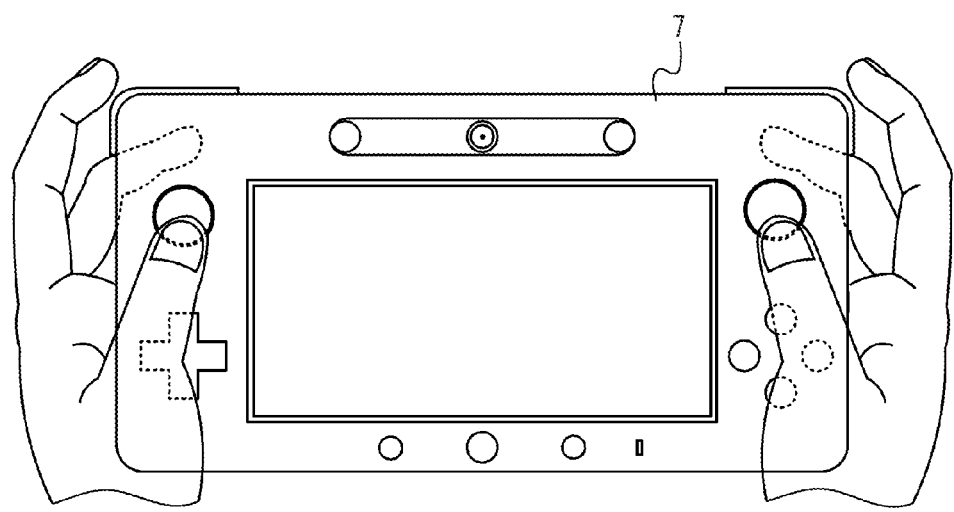

INFORMATION PROCESSING SYSTEM, INFORMATION PROCESSING APPARATUS, STORAGE MEDIUM HAVING INFORMATION PROCESSING PROGRAM STORED THEREON, AND CONTENT PLAYBACK CONTROL METHOD

CROSS REFERENCE TO RELATED APPLICATION

The disclosure of Japanese Patent Application No. 2011-125865 filed on Jun. 3, 2011 is incorporated herein by reference.

FIELD

The present specification discloses an information processing system, an information processing apparatus, a storage medium having an information processing program stored thereon, and a content playback control method.

BACKGROUND AND SUMMARY

There are conventional techniques for viewing a webpage, or the like, obtained from the Internet, using a television. For example, with the conventional technique, it is possible to access the Internet by means of a game apparatus to display a webpage on the Internet on a television. Thus, a user can view a webpage on a television whose screen is larger than an ordinary monitor used with a personal computer. For example, by displaying a webpage including content items such as videos and still images on a television, it is easier even for a plurality of people to view the content items and it is possible to provide strongly-appealing images.

Since the above technique is simply for displaying a webpage on a television, it often fails to provide an easy-to-view and well-controllable content playback.

Thus, the present specification discloses an information processing system, an information processing apparatus, a storage medium having an information processing program stored thereon, and a content playback control method with which it is possible to perform an easy-to-view and well-controllable content playback control.

(1) An information processing system disclosed in the present specification is as follows.

An information processing system including a stationary display device, and a portable display device on which a predetermined input can be made by a user, including:

a content playback unit for playing a content item to thereby generate a playback image, and displaying the playback image at least on the stationary display device;

a UI image generation unit for generating a user interface image used for specifying a content item to be played;

a switching display control unit for alternatively displaying the playback image being played and the user interface image on the portable display device while a content item is being played by the content playback unit; and a content specifying unit for specifying a content item to be played next based on a predetermined input made by the user on the portable display device using the user interface image, wherein the content playback unit next plays the content item specified by the content specifying unit.

The "information processing system" may be formed by a stationary display device, a portable display device, and one information processing apparatus, or may be formed by a stationary display device, a portable display device, and a plurality of information processing apparatuses. The portable display device may have the function of an information processing apparatus and perform processes (or some of them). The portable apparatus having the function of an information processing apparatus and the stationary information processing apparatus may share processes therebetween. The stationary display device may have the function of an information processing apparatus and perform processes. The "information processing apparatus" may be a multi-purpose information processing apparatus such as an ordinary personal computer, in addition to a game apparatus of an embodiment to be described below.

The "user interface image used for selecting a content item to be played" may be an image including a list (typically, a list of thumbnails or a list of names) of content items that can be played, or an image used for searching through content items that can be played. A content item to be played is selected using these images.

The "portable display device" is a display device that has such a size that it can be held and moved by the user, and the position thereof can be changed to any position by the user.

The "stationary display device" is a concept including any stationary display device, in addition to a television of an embodiment to be described below.

With configuration (1) above, it is possible to display a content item on the stationary display device in an easy-to-view manner, while it is possible to perform an operation of specifying a content item to be played next using the portable display device without hindering the viewing of the content item being currently watched. The operator of the portable display device can perform the backstage operation of specifying a content item to be played next, and can also enjoy the content item being currently played by having the playback image displayed on the portable display device.

(2) The configuration may be as follows:

the information processing apparatus further includes a playback status display control unit for displaying, on the portable display device, a playback status image which represents a playback status of the content item being played by the content playback unit, wherein the playback status display control unit displays, on the portable display device, the playback status image together with the playback image when display has been switched by the switching display control unit to the playback image being played, and displays, on the portable display device, the playback status image together with the user interface image when display has been switched by the switching display control unit to the user interface image.

With configuration (2) above, it is possible to check the playback status of the content item being currently played on the portable display device. On the portable display device, the playback status of the content item being currently played is displayed even when a content item to be played next is being selected. Therefore, it is possible to select a content item to be played next while checking the playback status of the content item being currently played on the portable display device.

(3) The configuration may be as follows:

the playback status display control unit displays the playback status image below the playback image when display has been switched by the switching display control unit to the playback image being played, and displays the playback status image above the user interface image when display has been switched by the switching display control unit to the user interface image.

With configuration (3) above, it is the normal state of use where the operator of the portable display device performs operations while holding the portable display device at hand in front of the stationary display device. Then, it is often the case that the screen of the stationary display device is located above the screen of the portable display device. The playback status image is arranged below the playback image on the portable display device when display has been switched to the playback image on the portable display device, and the playback status image is located substantially below the playback image on the stationary display device when display has been switched to the user interface image. In either case, the positional relationship does not change substantially, and it is therefore possible to provide a user interface that is intuitive and easy to use.

(4) The configuration may be as follows:

the portable display device includes a coordinate input unit;

the information processing system further includes a playback control display control unit for displaying, on the portable display device, a playback control image which is displayed for controlling the playback of the content item being played by the content playback unit;

the playback control display control unit displays, on the portable display device, the playback control image together with the playback image when display has been switched by the switching display control unit to the playback image being played, and displays, on the portable display device, the playback control image together with the user interface image when display has been switched by the switching display control unit to the user interface image; and the playback control unit performs a playback control on a content item being currently played when a coordinate input is made on the playback control image by the coordinate input unit.

With configuration (4) above, a playback control of a content item being played can be performed on the portable display device. Since it is possible to perform a playback control of a content item being currently played even when selecting a content item to be played next on the portable display device, it is possible to select a content item to be played next while controlling the playback of the content item being currently played on the portable display device.

(5) The configuration may be as follows:

the playback control display control unit displays the playback control image below the playback image when display has been switched by the switching display control unit to the playback image being played, and displays the playback control image above the user interface image when display has been switched by the switching display control unit to the user interface image.

With configuration (5) above, the playback control image is arranged below the playback image on the portable display device when the playback image is displayed on the portable display device, and the playback control image is located substantially below the playback image on the stationary display device even when the user interface image is displayed. Therefore, it is possible to provide a user interface that is intuitive and easy to use.

(6) The configuration may be as follows:

the portable display device includes a coordinate input unit; and the switching display control unit switches what is displayed on the portable display device from the playback image to the user interface image when a coordinate input representing an upward direction is made on the coordinate input unit.

With configuration (6) above, display of the portable display device is switched from the playback image to the user interface image when a coordinate input representing an upward direction (i.e., the direction where there is the playback image on the stationary display device) is made on the portable display device. Therefore, it is possible to provide a user interface that is intuitive and easy to use, in which it feels as if the content item being played on the portable display device were merging and disappearing into the content item being played on the stationary display device.

(7) The configuration may be as follows:

when switching from the user interface image to the playback image, the switching display control unit displays the playback image of the content item being currently played by the content playback unit so that the playback image gradually slides in from an upward direction on the portable display device.

With configuration (7) above, it is possible to provide a user interface that is intuitive and easy to use, in which it feels as if the content item being played on the stationary display device were falling down into the portable display device.

(8) The configuration may be as follows:

when switching from the playback image to the user interface image, the switching display control unit displays the playback image of the content item being currently played by the content playback unit so that the playback image gradually slides out in an upward direction on the portable display device.

(9) The configuration may be as follows:

when playing a content item that has been specified by the content specifying unit to be played next, the content playback unit displays the playback image on the stationary display device, and switches display of the portable display device to the playback image by the switching display control unit to display the playback image on the portable display device.

(10) The configuration may be as follows:

when playback of a content item by the content playback unit is completed, the switching display control unit displays the user interface image both on the portable display device and on the stationary display device.

(11) The configuration may be as follows:

the information processing system further includes a communication unit that can be connected to a network for communicating with a predetermined external device storing content items therein via the network;

the UI image generation unit obtains a list of content items stored in the external device via the communication unit to generate an interface image for specifying a content item to be played from among the list of content items; and the content playback unit obtains the content item specified by the content specifying unit from the external device via the communication unit to play the content item.

(12) The configuration may be as follows:

the information processing system includes an information processing unit capable of generating display data and outputting the display data to the stationary display device and the portable display device;

the information processing unit functions as the UI image generation unit and the content playback unit;

the user interface image generated by the UI image generation unit and the playback image produced by the content playback unit are selectively or simultaneously output to the portable display device;

the playback image produced by the content playback unit is output to the stationary display device; and the stationary display device and the portable display device receive and display the display data from an information processing apparatus.

The present specification discloses an example information processing apparatus having like components to those of (1) to (12) above. The present specification also discloses an example non-transitory computer-readable storage medium having stored thereon an information processing program, which causes a computer of an information processing system or an information processing apparatus to function as like components to those of (1) to (12) above. Moreover, the present specification also discloses an example content playback control method to be carried out by an information processing system or an information processing apparatus of (1) to (12) above.

As described above, with the information processing system, the information processing apparatus, the information processing program and the content playback control method described above, it is possible to realize both ease to view a content item and ease to specify a content item to be played.

These and other objects, features, aspects and advantages will become more apparent from the following detailed description when taken in conjunction with the accompanying drawings.

BRIEF DESCRIPTION OF THE DRAWINGS

FIG. 2 is a block diagram showing an internal configuration of a non-limiting example of a game apparatus;

FIG. 9 a diagram showing the example terminal device being held by a user;

DETAILED DESCRIPTION OF NON-LIMITING EXAMPLE EMBODIMENTS

1. Overall Configuration of the Game System

Figure 1:
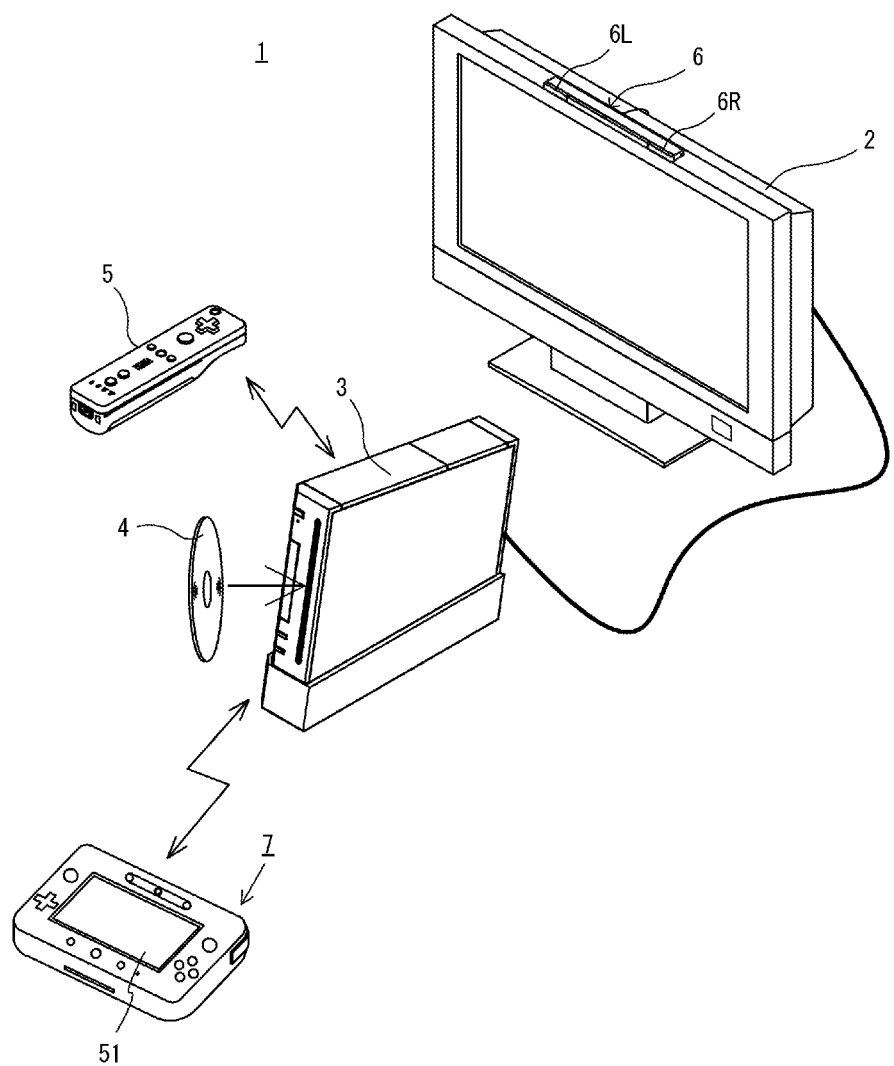
FIG. 1 is an external view of a non-limiting example of a game system.

An example game system 1 according to an example embodiment will now be described with reference to the drawings. FIG. 1 is an external view of the game system 1. In FIG. 1, a game system 1 includes a stationary display device (hereinafter referred to as a "television") 2 such as a television receiver, a stationary game apparatus 3, an optical disc 4, a controller 5, a marker device 6, and a terminal device 7. In the game system 1, the game apparatus 3 performs game processes based on game operations performed using the controller 5 and/or the terminal device 7, and game images acquired through the game processes are displayed on the television 2 and/or the terminal device 7.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative example embodiments, the game apparatus 3 and the stationary display device may be an integral section. Also, the communication between the game apparatus 3 and the television 2 may be wireless communication.

The marker device 6 is provided along the periphery of the screen (on the upper side of the screen in FIG. 1) of the television 2. The user (player) can perform game operations by moving the controller 5, the details of which will be described later, and the marker device 6 is used by the game apparatus 3 for calculating the movement, position, attitude, etc., of the controller 5. The marker device 6 includes two markers 6R and 6L on opposite ends thereof. Specifically, the marker 6R (as well as the marker 6L) includes one or more infrared LEDs (Light Emitting Diodes), and emits an infrared light in a forward direction from the television 2. The marker device 6 is connected to the game apparatus 3, and the game apparatus 3 is able to control the lighting of each infrared LED of the marker device 6. Note that the marker device 6 is of a transportable type so that the user can install the marker device 6 in any desired position. While FIG. 1 shows an example embodiment in which the marker device 6 is arranged on top of the television 2, the position and the direction of arranging the marker device 6 are not limited to this particular arrangement.

The controller 5 provides the game apparatus 3 with operation data representing the content of operations performed on the controller itself. The controller 5 and the game apparatus 3 can wirelessly communicate with each other. In the present example embodiment, the wireless communication between the controller 5 and the game apparatus 3 uses, for example, Bluetooth (Registered Trademark) technology. In other example embodiments, the controller 5 and the game apparatus 3 may be connected by a wired connection. Furthermore, in the present example embodiment, the game system 1 includes only one controller 5, but the game apparatus 3 is capable of communicating with a plurality of controllers, so that by using a predetermined number of controllers at the same time, a plurality of people can play the game. The configuration of the controller 5 will be described in detail later.

The terminal device 7 is of a size that can be held by the user, so that the user can hold and move the terminal device 7 or can place the terminal device 7 in any desired position. As will be described in detail later, the terminal device 7 includes a liquid crystal display (LCD) 51, and input means (e.g., a touch panel 52 and a gyroscope 64 to be described later). The terminal device 7 can communicate with the game apparatus 3 wirelessly (or wired). The terminal device 7 receives data for images generated by the game apparatus 3 (e.g., game images) from the game apparatus 3, and displays the images on the LCD 51. Note that in the present example embodiment, the LCD is used as the display of the terminal device 7, but the terminal device 7 may include any other display device, e.g., a display device utilizing electro luminescence (EL). Furthermore, the terminal device 7 transmits operation data representing the content of operations performed thereon to the game apparatus 3.

2. Internal Configuration of the Game Apparatus 3

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that the game apparatus 3 generates both images to be displayed on the television 2 and images to be displayed on the terminal device 7. Hereinafter, the images to be displayed on the television 2 are referred to as the "television images" and the images to be displayed on the terminal device 7 are referred to as the "terminal images".

The DSP 11c, functioning as an audio processor, generates sound data using sound data and sound waveform (e.g., tone quality) data stored in one or both of the internal main memory 11e and the external main memory 12. Note that in the present example embodiment, game sounds to be generated are classified into two types as in the case of the game images, one being outputted from the speaker of the television 2, the other being outputted from speakers of the terminal device 7. Hereinafter, in some cases, the sounds to be outputted from the television 2 are referred to as "television sounds", and the sounds to be outputted from the terminal device 7 are referred to as "terminal sounds".

Among the images and sounds generated by the game apparatus 3 as described above, both image data and sound data to be outputted from the television 2 are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a. Note that the game apparatus 3 and the television 2 may be connected in any manner, and a control command for controlling the television 2 may be transmitted to the television 2 by the game apparatus 3 in a wired or wireless manner. For example, an HDMI cable, which supports the HDMI (high-definition multimedia interface) standard, may be used. The HDMI standard allows a device to control another device connected thereto on the basis of a function called CEC (consumer electronics control). Accordingly, in the case where the HDMI cable is used so that the game apparatus 3 can control the television 2, the game apparatus 3 can turn on the television 2 or switch between inputs to the television 2 at appropriate times.

Furthermore, among the images and sounds generated by the game apparatus 3, both image data and sound data to be outputted by the terminal device 7 are transmitted to the terminal device 7 by the input/output processor 11a, etc. The data transmission to the terminal device 7 by the input/output processor 11a, etc., will be described later.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The game apparatus 3 is capable of connecting to a network such as the Internet to communicate with external information processing apparatuses (e.g., other game apparatuses, various servers, etc.). Specifically, the input/output processor 11a can be connected to a network such as the Internet via the network communication module 18 and the antenna 22 to communicate with external information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and the external information processing apparatuses. Moreover, the flash memory 17 may have a game program stored therein.

Furthermore, the game apparatus 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the game apparatus 3 is capable of exchanging data, for images, sound, etc., with the terminal device 7. When transmitting game images (terminal game images) to the terminal device 7, the input/output processor 11a outputs game image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the game apparatus 3 to the terminal device 7 is image data used in a game, and the playability of a game can be adversely influenced if there is a delay in the images displayed in the game. Therefore, delay may be avoided as much as possible in transmitting image data from the game apparatus 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the game apparatus 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method may use a high compression rate but may cause less sound degradation. Also, in another example embodiment, the sound data may be transmitted without compression. The terminal communication module 28 transmits compressed image and sound data to the terminal device 7 via the antenna 29.

Furthermore, in addition to the image and sound data, the game apparatus 3 transmits various control data to the terminal device 7 where appropriate. The control data is data representing an instruction to control a component included in the terminal device 7, e.g., an instruction to control lighting of a marker section (a marker section 55 shown in FIG. 10) or an instruction to control shooting by a camera (a camera 56 shown in FIG. 10). The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the game apparatus 3 to the terminal device 7 may or may not be coded depending on the situation.

Furthermore, the game apparatus 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the game apparatus 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the game apparatus 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied from an external power source to the components of the game apparatus 3 via an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other example embodiments, some of the components of the game apparatus 3 may be provided as extension devices separate from the game apparatus 3. In this case, an extension device may be connected to the game apparatus 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a game apparatus which does not include the above components, the game apparatus can communicate with the terminal device 7.

3. Configuration of the Controller 5

Figure 3:
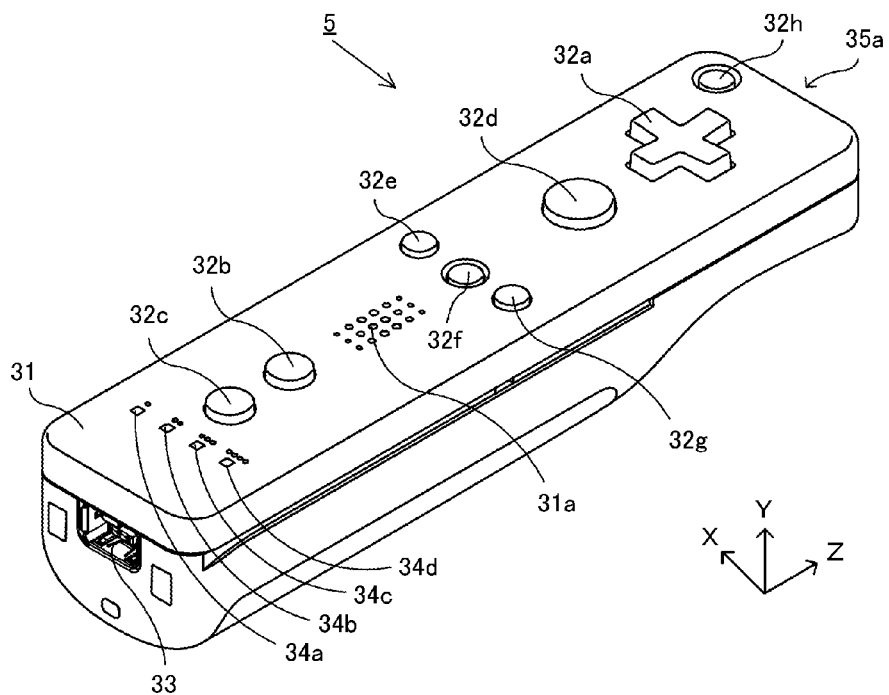
FIG. 3 is a perspective view showing an external configuration of a non-limiting example of a controller.
Figure 4:
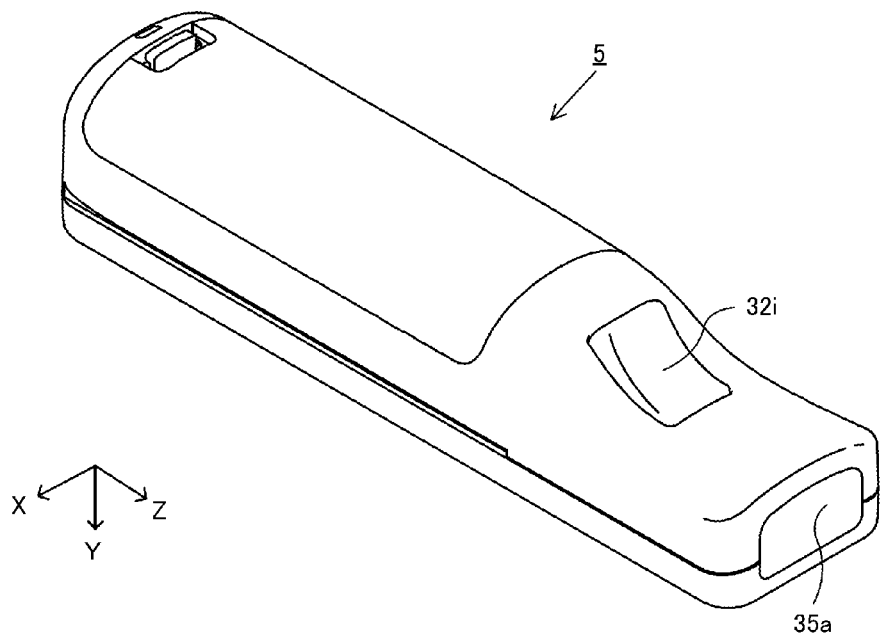
FIG. 4 is a perspective view showing an external configuration of the example controller.

Next, with reference to FIGS. 3 to 7, the controller 5 will be described. FIG. 3 is a perspective view illustrating an external configuration of the controller 5. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. The user can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present example embodiment, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are appropriately assigned their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the user.

On the rear surface of the housing 31, the connector 33 is provided. The connector 33 is used for connecting the controller 5 to another device (e.g., another sensor section or controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another controller. The LEDs 34a, 34b, 34c, and 34d are each used for informing the user of the controller type which is currently being set for the controller 5 being used, and for informing the user of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

Figure 5:
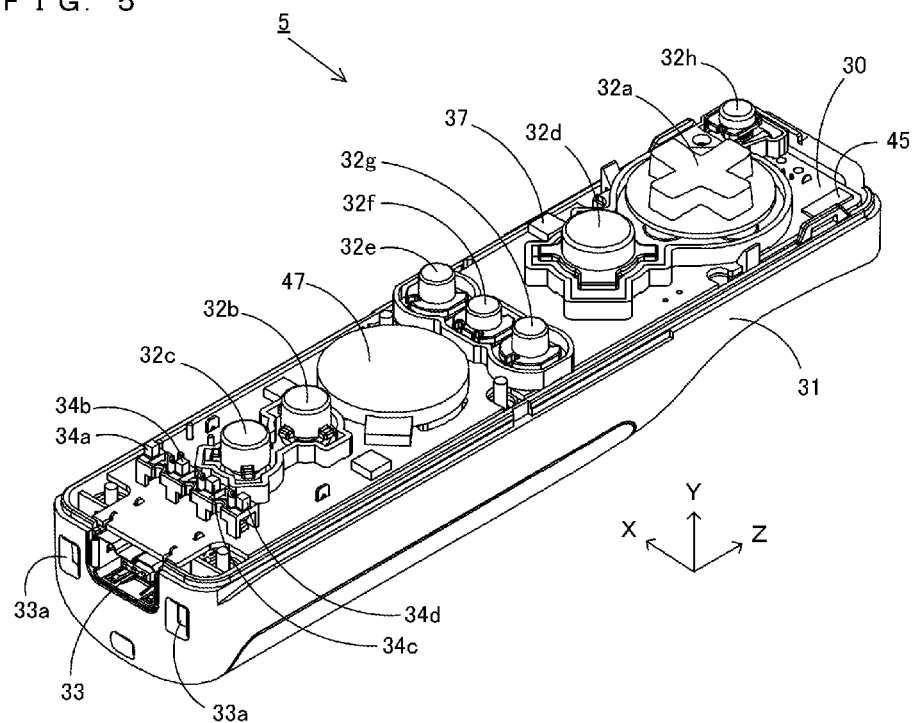
FIG. 5 is a diagram showing an internal structure of the example controller.
Figure 6:
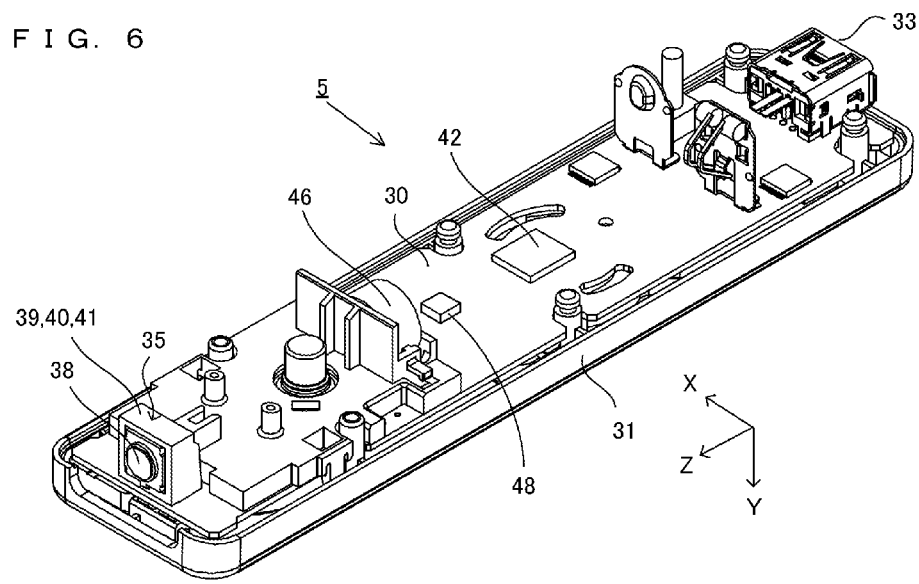
FIG. 6 is a diagram showing an internal structure of the example controller.

On the top surface of the housing 31, sound holes 31a for externally outputting a sound from a speaker 47 (shown in FIG. 5) incorporated in the controller 5 is provided between the first button 32b and the home button 32E Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 47, and the like are provided. These elements are connected to a microcomputer 42 (see FIG. 6) via lines (not shown) formed on the substrate 30 and the like. In the present example embodiment, the acceleration sensor 37 is provided on a position offset from the center of the controller 5 with respect to the X-axis direction. Thus, calculation of the movement of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 46 are provided. The vibrator 46 is, for example, a vibration motor or a solenoid, and is connected to the microcomputer 42 via lines formed on the substrate 30 or the like. The controller 5 is vibrated by actuation of the vibrator 46 based on a command from the microcomputer 42. Therefore, the vibration is conveyed to the user's hand holding the controller 5, and thus a so-called vibration-feedback game is realized. In the present example embodiment, the vibrator 46 is disposed slightly toward the front of the housing 31. That is, the vibrator 46 is positioned offset from the center toward the end of the controller 5, and therefore the vibration of the vibrator 46 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 47, and the like.

FIGS. 3 to 6 only show examples of the shape of the controller 5, the shape of each operation button, the number and the positions of acceleration sensors and vibrators, and so on, and other shapes, numbers, and positions may be employed. Further, although in the present example embodiment the imaging direction of the image pickup means is the Z-axis positive direction, the imaging direction may be any direction. That is, the imagining information calculation section 35 (the light incident surface 35*a* through which a light is incident on the imaging information calculation section 35) of the controller 5 may not necessarily be provided on the front surface of the housing 31, but may be provided on any other surface on which a light can be received from the outside of the housing 31.

Figure 7:
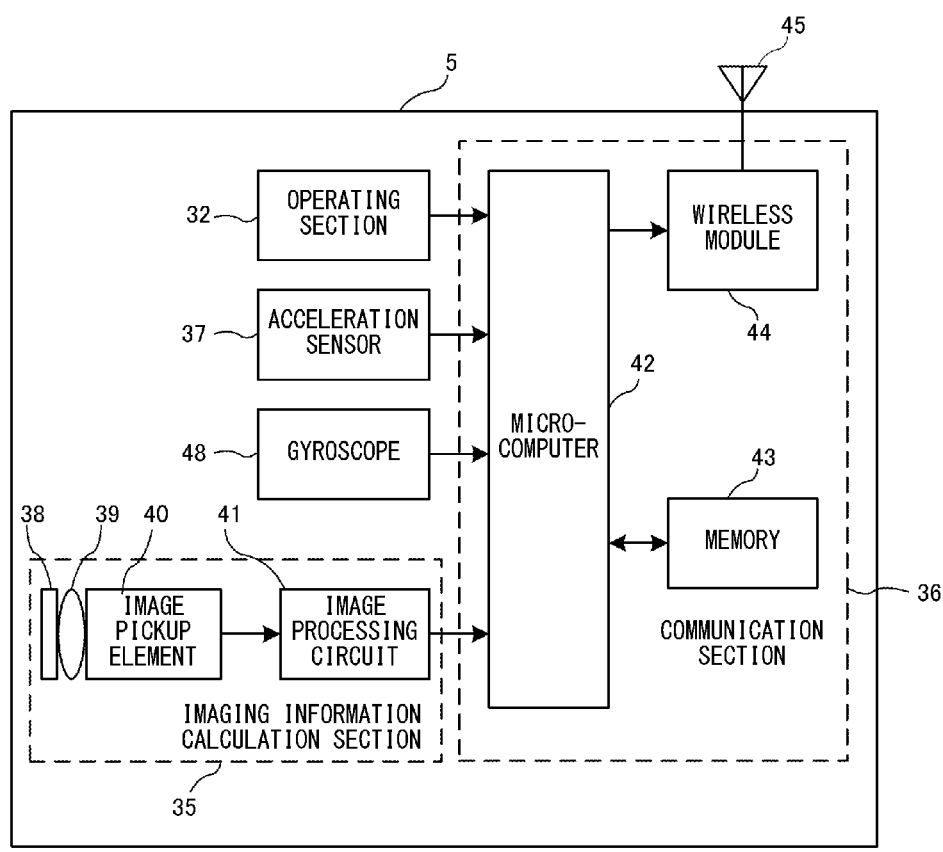
FIG. 7 is a block diagram showing a configuration of the example controller.

FIG. 7 is a block diagram illustrating a configuration of the controller 5. The controller 5 includes an operating section 32 (the operation buttons 32*a* to 32*i*), the imaging information calculation section 35, a communication section 36, the acceleration sensor 37, and a gyroscope 48. The controller 5 transmits, as operation data, data representing the content of an operation performed on the controller 5 itself, to the game apparatus 3. Note that hereinafter, in some cases, operation data transmitted by the controller 5 is referred to as "controller operation data", and operation data transmitted by the terminal device 7 is referred to as "terminal operation data".

The operating section 32 includes the operation buttons 32*a* to 32*i* described above, and outputs, to the microcomputer 42 of the communication section 36, operation button data indicating an input state (that is, whether or not each operation button 32*a* to 32*i* is pressed) of each operation button 32*a* to 32*i*.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The marker section 55 of the terminal device 7 and the marker device 6, which are subjects to be imaged, include markers for outputting infrared light. Therefore, the infrared filter 38 enables the image pickup element 40 to receive only the infrared light transmitted through the infrared filter 38 and generate image data, so that an image of each subject to be imaged (the marker section 55 and/or the marker device 6) can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged. The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another example embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. The acceleration sensor 37 is, for example, a capacitive MEMS (Micro-Electro Mechanical System) acceleration sensor. However, another type of acceleration sensor may be used.

In the present example embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the controller 5.

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present example embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 63 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another example embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another appropriate parameter).

The gyroscope 48 detects angular rates about three axes (in the present example embodiment, the X-, Y-, and Z-axes). In the present specification, the directions of rotation about the X-axis, the Y-axis, and the Z-axis relative to the imaging direction (the Z-axis positive direction) of the controller 5 are referred to as a pitch direction, a yaw direction, and a roll direction, respectively. So long as the gyroscope 48 can detect the angular rates about the three axes, any number thereof may be used, and also any combination of sensors may be included therein. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis). For example, the gyroscope 48 may be a three-axis gyroscope or may include a combination of a two-axis gyroscope and a one-axis gyroscope to detect the angular rates about the three axes. Data representing the angular rates detected by the gyroscope 48 is outputted to the communication section 36. Alternatively, the gyroscope 48 may simply detect an angular rate about one axis or angular rates about two axes.

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process.

Data outputted from the operating section 32, the imaging information calculation section 35, the acceleration sensor 37, and the gyroscope 48 to the microcomputer 42 is temporarily stored to the memory 43. The data is transmitted as operation data (controller operation data) to the game apparatus 3. Specifically, at the time of the transmission to the controller communication module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the operation data. The CPU 10 of the game apparatus 3 performs the game process using the operation data acquired from the controller 5. The wireless transmission from the communication section 36 to the controller communication module 19 is sequentially performed at a predetermined time interval. Since the game process is generally performed at a cycle of 1/60 sec. (corresponding to one frame time), data may be transmitted at a cycle of a shorter time period. The communication section 36 of the controller 5 outputs, to the controller communication module 19 of the game apparatus 3, the operation data at intervals of 1/200 of a second, for example.

As described above, the controller 5 can transmit marker coordinate data, acceleration data, angular rate data, and operation button data as operation data representing operations performed thereon. In addition, the game apparatus 3 executes the game process using the operation data as game inputs. Accordingly, by using the controller 5, the user can perform the game operation of moving the controller 5 itself, in addition to conventionally general game operations of pressing operation buttons. For example, it is possible to perform the operations of tilting the controller 5 to arbitrary attitudes, pointing the controller 5 to arbitrary positions on the screen, and moving the controller 5 itself.

Also, in the present example embodiment, the controller 5 is not provided with any display means for displaying game images, but the controller 5 may be provided with a display means for displaying an image or suchlike to indicate, for example, a remaining battery level.

4. Configuration of the Terminal Device 7

Figure 8:
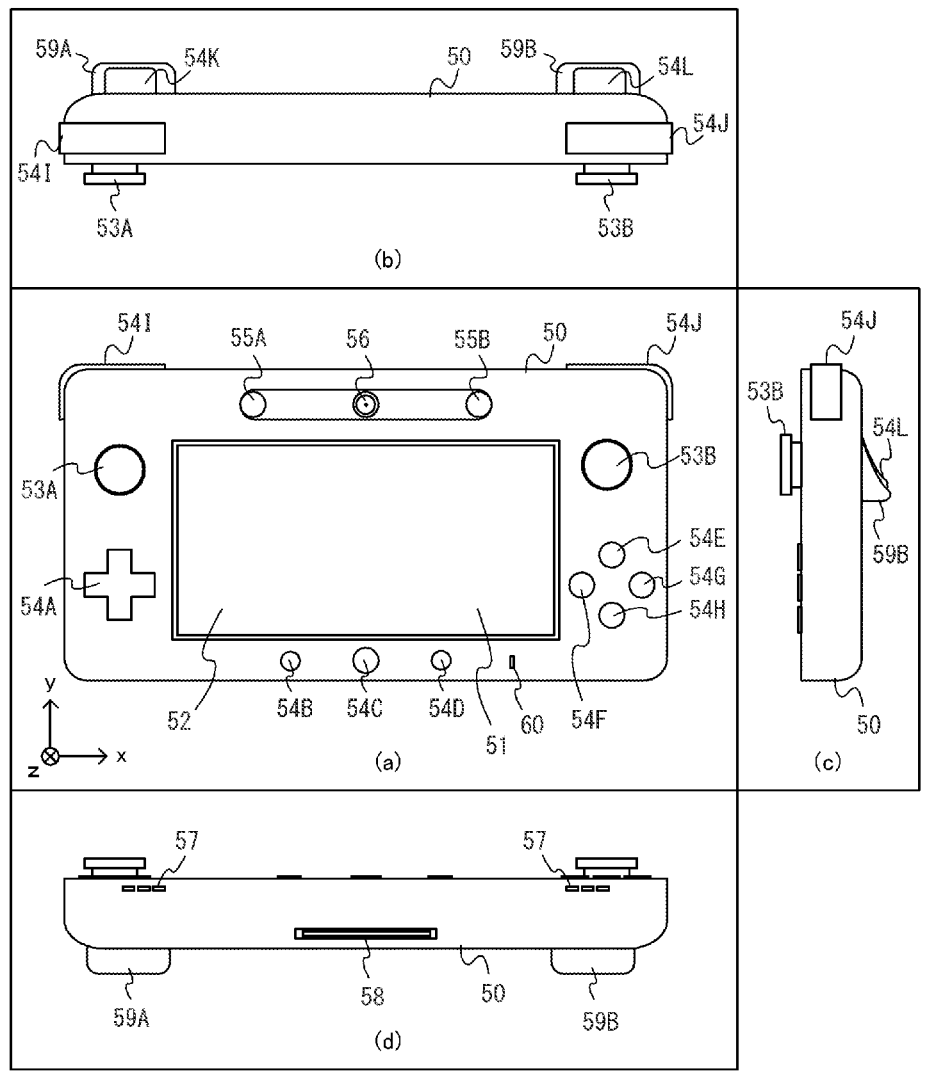
FIG. 8 is a diagram showing an external configuration of an example terminal device.
Figure 10:
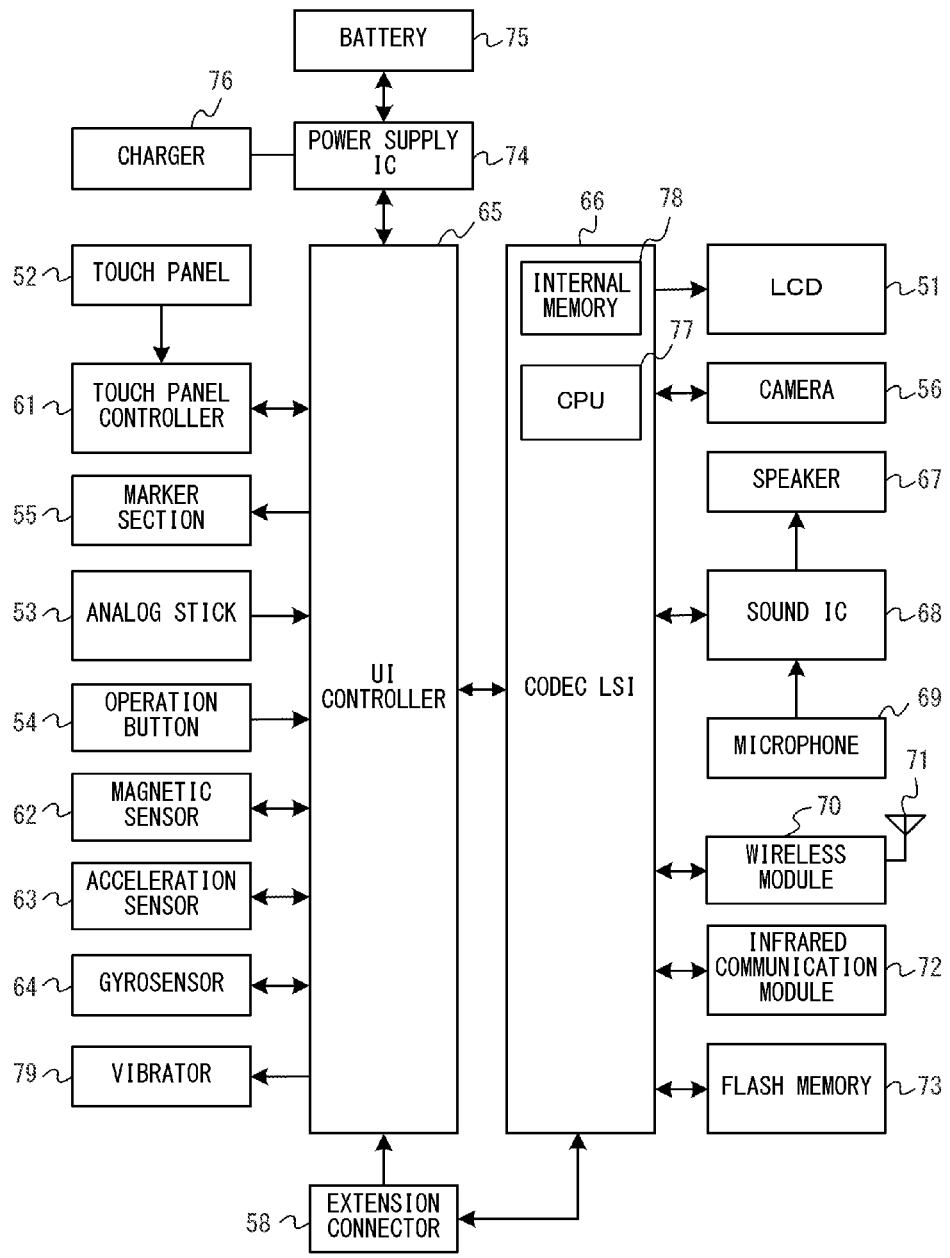
FIG. 10 is a block diagram showing an internal configuration of the example terminal device.

Next, referring to FIGS. 8 to 10, the configuration of the terminal device 7 will be described. FIG. 8 provides views illustrating an external configuration of the terminal device 7. In FIG. 8, parts (a), (b), (c), and (d) are a front view, a top view, a right side view, and a bottom view, respectively, of the terminal device 7. FIG. 9 is a diagram illustrating the terminal device 7 being held by the user.

As shown in FIG. 8, the terminal device 7 has a housing 50 roughly shaped in the form of a horizontally rectangular plate. The housing 50 is sized to be held by the user. Thus, the user can hold and move the terminal device 7, and can change the position of the terminal device 7.

The terminal device 7 includes an LCD 51 on the front surface of the housing 50. The LCD 51 is provided approximately at the center of the surface of the housing 50. Therefore, the user can hold and move the terminal device while viewing the screen of the LCD 51 by holding the housing 50 by edges to the left and right of the LCD 51, as shown in FIG. 9. While FIG. 9 shows an example where the user holds the terminal device 7 horizontal (horizontally long) by holding the housing 50 by edges to the left and right of the LCD 51, the user can hold the terminal device 7 vertical (vertically long).

As shown in FIG. 8(a), the terminal device 7 includes a touch panel 52 on the screen of the LCD 51 as an operating means. In the present example embodiment, the touch panel 52 is a resistive touch panel. However, the touch panel is not limited to the resistive type, and may be of any type such as capacitive. The touch panel 52 may be single-touch or multi-touch. In the present example embodiment, a touch panel having the same resolution (detection precision) as the LCD 51 is used as the touch panel 52. However, the touch panel 52 and the LCD 51 do not have to be equal in resolution. While a stylus is usually used for providing input to the touch panel 52, input to the touch panel 52 can be provided not only by the stylus but also by the user's finger. Note that the housing 50 may be provided with an accommodation hole for accommodating the stylus used for performing operations on the touch panel 52. In this manner, the terminal device 7 includes the touch panel 52, and the user can operate the touch panel 52 while moving the terminal device 7. Specifically, the user can provide input directly to the screen of the LCD 51 (from the touch panel 52) while moving the screen.

As shown in FIG. 8, the terminal device 7 includes two analog sticks 53A and 53B and a plurality of buttons 54A to 54L, as operating means. The analog sticks 53A and 53B are devices capable of directing courses. Each of the analog sticks 53A and 53B is configured such that its stick portion to be operated with the user's finger is slidable or tiltable in an arbitrary direction (at an arbitrary angle in any of the up, down, left, right, and oblique directions) with respect to the surface of the housing 50. Moreover, the left analog stick 53A and the right analog stick 53B are provided to the left and the right, respectively, of the screen of the LCD 51. Accordingly, the user can provide an input for course direction using the analog stick with either the left or the right hand. In addition, as shown in FIG. 9, the analog sticks 53A and 53B are positioned so as to allow the user to manipulate them while holding the terminal device 7 at its left and right edges, and therefore the user can readily manipulate the analog sticks 53A and 53B while moving the terminal device 7 by hand.

The buttons 54A to 54L are operating means for providing predetermined input. As will be discussed below, the buttons 54A to 54L are positioned so as to allow the user to manipulate them while holding the terminal device 7 at its left and right edges (see FIG. 9). Therefore the user can readily manipulate the operating means while moving the terminal device 7 by hand.

As shown in FIG. 8(a), of all the operation buttons 54A to 54L, the cross button (direction input button) 54A and the buttons 54B to 54H are provided on the front surface of the housing 50. That is, these buttons 54A to 54G are positioned so as to allow the user to manipulate them with his/her thumbs (see FIG. 9).

The cross button 54A is provided to the left of the LCD 51 and below the left analog stick 53A. That is, the cross button 54A is positioned so as to allow the user to manipulate it with his/her left hand. The cross button 54A is a cross-shaped button which makes it possible to specify at least up, down, left and right directions. Also, the buttons 54B to 54D are provided below the LCD 51. These three buttons 54B to 54D are positioned so as to allow the user to manipulate them with either hand. Moreover, the four buttons 54E to 54H are provided to the right of the LCD 51 and below the right analog stick 53B. That is, the four buttons 54E to 54H are positioned so as to allow the user to manipulate them with the right hand. In addition, the four buttons 54E to 54H are positioned above, to the left of, to the right of, and below the central position among them. Therefore, the four buttons 54E to 54H of the terminal device 7 can be used to function as buttons for allowing the user to specify the up, down, left and right directions.

Furthermore, as shown in FIGS. 8(a), 8(b) and 8(c), the first L button 54I and the first R button 54J are provided at the upper (left and right) corners of the housing 50. Specifically, the first L button 54I is provided at the left edge of the top surface of the plate-like housing 50 so as to be exposed both from the top surface and the left-side surface. The first R button 54J is provided at the right edge of the top surface of the housing 50 so as to be exposed both from the top surface and the right-side surface. Thus, the first L button 54I is positioned so as to allow the user to manipulate it with the left index finger, and the first R button 54J is positioned so as to allow user to manipulate it with the right index finger (see FIG. 9).

Also, as shown in FIGS. 8(b) and 8(c), the second L button 54K and the second R button 54L are positioned at stands 59A and 59B, respectively, which are provided on the back surface of the plate-like housing 50 (i.e., the plane opposite to the surface where the LCD 51 is provided). The second L button 54K is provided at a comparatively high position on the right side of the back surface of the housing 50 (i.e., the left side as viewed from the front surface side), and the second R button 54L is provided at a comparatively high position on the left side of the back surface of the housing 50 (i.e., the right side as viewed from the front surface side). In other words, the second L button 54K is provided at a position approximately opposite to the left analog stick 53A provided on the front surface, and the second R button 54L is provided at a position approximately opposite to the right analog stick 53B provided on the front surface. Thus, the second L button 54K is positioned so as to allow the user to manipulate it with the left middle finger, and the second R button 54L is positioned so as to allow the user to manipulate it with the right middle finger (see FIG. 9). In addition, the second L button 54K and the second R button 54L are provided on the surfaces of the stands 59A and 59B that are directed obliquely upward, as shown in FIG. 8(c), and therefore, the second L button 54K and the second R button 54L have button faces directed obliquely upward. When the user holds the terminal device 7, the middle fingers will probably be able to move in the up/down direction, and therefore the button faces directed upward will allow the user to readily press the second L button 54K and the second R button 54L. Moreover, providing the stands on the back surface of the housing 50 allows the user to readily hold the housing 50, and furthermore, providing the buttons on the stands allows the user to readily manipulate the buttons while holding the housing 50.

Note that the terminal device 7 shown in FIG. 8 has the second L button 54K and the second R button 54L provided at the back surface, and therefore when the terminal device 7 is placed with the screen of the LCD 51 (the front surface of the housing 50) facing up, the screen might not be completely horizontal. Accordingly, in another example embodiment, three or more stands may be formed on the back surface of the housing 50. As a result, when the terminal device 7 is placed on the floor with the screen of the LCD 51 facing upward, all the stands contact the floor, so that the screen can be horizontal. Alternatively, the terminal device 7 may be placed horizontally by adding a detachable stand.

The buttons 54A to 54L are each appropriately assigned a function in accordance with the game program. For example, the cross button 54A and the buttons 54E to 54H may be used for direction-specifying operations, selection operations, etc., whereas the buttons 54B to 54E may be used for setting operations, cancellation operations, etc.

Although not shown in the figures, the terminal device 7 includes a power button for turning ON/OFF the terminal device 7. Moreover, the terminal device 7 may also include buttons for turning ON/OFF the screen of the LCD 51, performing a connection setting (pairing) with the game apparatus 3, and controlling the volume of speakers (speakers 67 shown in FIG. 10).

As shown in FIG. 8(*a*), the terminal device 7 has a marker section (a marker section 55 shown in FIG. 10), including markers 55A and 55B, provided on the front surface of the housing 50. The marker section 55 is provided in the upper portion of the LCD 51. The markers 55A and 55B are each formed by one or more infrared LEDs, as are the markers 6R and 6L of the marker device 6. The marker section 55 is used for the game apparatus 3 to calculate the movement, etc., of the controller 5, as is the marker device 6 described above. In addition, the game apparatus 3 can control the lighting of the infrared LEDs included in the marker section 55.

The terminal device 7 includes the camera 56 which is an image pickup means. The camera 56 includes an image pickup element (e.g., a CCD image sensor, a CMOS image sensor, or the like) having a predetermined resolution, and a lens. As shown in FIG. 8, in the present example embodiment, the camera 56 is provided on the front surface of the housing 50. Therefore, the camera 56 can pick up an image of the face of the user holding the terminal device 7, and can pick up an image of the user playing a game while viewing the LCD 51, for example.

Note that the terminal device 7 includes a microphone (a microphone 69 shown in FIG. 10) which is a sound input means. A microphone hole 60 is provided in the front surface of the housing 50. The microphone 69 is provided inside the housing 50 behind the microphone hole 60. The microphone detects sounds around the terminal device 7 such as the voice of the user.

The terminal device 7 includes speakers (speakers 67 shown in FIG. 10) which are sound output means. As shown in FIG. 8(*d*), speaker holes 57 are provided in the bottom surface of the housing 50. Sound emitted by the speakers 67 is outputted from the speaker holes 57. In the present example embodiment, the terminal device 7 includes two speakers, and the speaker holes 57 are provided at positions corresponding to the left and right speakers.

Also, the terminal device 7 includes an expansion connector 58 for connecting another device to the terminal device 7. In the present example embodiment, the expansion connector 58 is provided at the bottom surface of the housing 50, as shown in FIG. 8(*d*). Any additional device may be connected to the expansion connector 58, including, for example, a game-specific controller (a gun-shaped controller or suchlike) or an input device such as a keyboard. The expansion connector 58 may be omitted if there is no need to connect any additional devices to terminal device 7.

Note that as for the terminal device 7 shown in FIG. 8, the shapes of the operation buttons and the housing 50, the number and arrangement of components, etc., are merely illustrative, and other shapes, numbers, and arrangements may be employed.

Next, an internal configuration of the terminal device 7 will be described with reference to FIG. 10. FIG. 10 is a block diagram illustrating the internal configuration of the terminal device 7. As shown in FIG. 10, in addition to the components shown in FIG. 8, the terminal device 7 includes a touch panel controller 61, a magnetic sensor 62, the acceleration sensor 63, the gyroscope 64, a user interface controller (UI controller) 65, a codec LSI 66, the speakers 67, a sound IC 68, the microphone 69, a wireless module 70, an antenna 71, an infrared communication module 72, flash memory 73, a power supply IC 74, a battery 75, and a vibrator 79. These electronic components are mounted on an electronic circuit board and accommodated in the housing 50.

The UI controller 65 is a circuit for controlling the input/output of data to/from various input/output sections. The UI controller 65 is connected to the touch panel controller 61, an analog stick section 53 (including the analog sticks 53A and 53B), an operation button group 54 (including the operation buttons 54A to 54L), the marker section 55, the magnetic sensor 62, the acceleration sensor 63, the gyroscope 64, and the vibrator 79. The UI controller 65 is connected to the codec LSI 66 and the expansion connector 58. The power supply IC 74 is connected to the UI controller 65, and power is supplied to various sections via the UI controller 65. The built-in battery 75 is connected to the power supply IC 74 to supply power. A charger 76 or a cable with which power can be obtained from an external power source can be connected to the power supply IC 74 via a charging connector, and the terminal device 7 can be charged with power supplied from an external power source using the charger 76 or the cable. Note that the terminal device 7 can be charged by being placed in an unillustrated cradle having a charging function.

The touch panel controller 61 is a circuit connected to the touch panel 52 for controlling the touch panel 52. The touch panel controller 61 generates touch position data in a predetermined format based on signals from the touch panel 52, and outputs it to the UI controller 65. The touch position data represents, for example, the coordinates of a position on the input surface of the touch panel 52 at which an input has been made. The touch panel controller 61 reads a signal from the touch panel 52 and generates touch position data once per a predetermined period of time. Various control instructions for the touch panel 52 are outputted from the UI controller 65 to the touch panel controller 61.

The analog stick section 53 outputs, to the UI controller 65, stick data representing the direction and the amount of sliding (or tilting) of the stick portion operated with the user's finger. The operation button group 54 outputs, to the UI controller 65, operation button data representing the input status of each of the operation buttons 54A to 54L (regarding whether it has been pressed).

The magnetic sensor 62 detects an azimuthal direction by sensing the magnitude and the direction of a magnetic field. Azimuthal direction data representing the detected azimuthal direction is outputted to the UI controller 65. Control instructions for the magnetic sensor 62 are outputted from the UI controller 65 to the magnetic sensor 62. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 62 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 7 moves, the azimuthal direction data changes, and it is therefore possible to calculate the change in the attitude of the terminal device 7.

The acceleration sensor 63 is provided inside the housing 50 for detecting the magnitude of linear acceleration along each direction of three axes (the x-, y- and z-axes shown in FIG. 8(*a*)). Specifically, the acceleration sensor 63 detects the magnitude of linear acceleration along each axis, where the longitudinal direction of the housing 50 is taken as the x-axis, the width direction of the housing 50 as the y-axis, and a direction perpendicular to the front surface of the housing 50 as the z-axis. Acceleration data representing the detected acceleration is outputted to the UI controller 65. Also, control instructions for the acceleration sensor 63 are outputted from the UI controller 65 to the acceleration sensor 63. In the present example embodiment, the acceleration sensor 63 is assumed to be, for example, a capacitive MEMS acceleration sensor, but in another example embodiment, an acceleration sensor of another type may be employed. The acceleration sensor 63 may be an acceleration sensor for detection in one axial direction or two axial directions.

The gyroscope 64 is provided inside the housing 50 for detecting angular rates about the three axes, i.e., the x-, y-, and z-axes. Angular rate data representing the detected angular rates is outputted to the UI controller 65. Also, control instructions for the gyroscope 64 are outputted from the UI controller 65 to the gyroscope 64. Note that any number and combination of gyroscopes may be used for detecting angular rates about the three axes, and similar to the gyroscope 48, the gyroscope 64 may include a two-axis gyroscope and a one-axis gyroscope. Alternatively, the gyroscope 64 may be a gyroscope for detection in one axial direction or two axial directions.

The vibrator 79 is, for example, a vibration motor or a solenoid, and is connected to the UI controller 65. The terminal device 7 is vibrated by actuation of the vibrator 79 based on an instruction from the UI controller 65. Therefore, the vibration is conveyed to the user's hand holding the terminal device 7, and thus a so-called vibration-feedback game is realized.

The UI controller 65 outputs operation data to the codec LSI 66, including touch position data, stick data, operation button data, azimuthal direction data, acceleration data, and angular rate data received from various components described above. If another device is connected to the terminal device 7 via the expansion connector 58, data representing an operation performed on that device may be further included in the operation data.

The codec LSI 66 is a circuit for performing a compression process on data to be transmitted to the game apparatus 3, and a decompression process on data transmitted from the game apparatus 3. The LCD 51, the camera 56, the sound IC 68, the wireless module 70, the flash memory 73, and the infrared communication module 72 are connected to the codec LSI 66. The codec LSI 66 includes a CPU 77 and internal memory 78. While the terminal device 7 does not perform any game process itself, the terminal device 7 may execute a minimal set of programs for its own management and communication purposes. Upon power-on, the CPU 77 executes a program loaded into the internal memory 78 from the flash memory 73, thereby starting up the terminal device 7. Also, some area of the internal memory 78 is used as VRAM for the LCD 51.

The camera 56 picks up an image in response to an instruction from the game apparatus 3, and outputs data for the pick-up image to the codec LSI 66. Also, control instructions for the camera 56, such as an image pickup instruction, are outputted from the codec LSI 66 to the camera 56. Note that the camera 56 can also record video. Specifically, the camera 56 can repeatedly pick up images and repeatedly output image data to the codec LSI 66.

The sound IC 68 is a circuit connected to the speakers 67 and the microphone 69 for controlling input/output of sound data to/from the speakers 67 and the microphone 69. Specifically, when sound data is received from the codec LSI 66, the sound IC 68 outputs to the speakers 67 a sound signal obtained by performing D/A conversion on the sound data so that sound is outputted from the speakers 67. The microphone 69 senses sound propagated to the terminal device 7 (e.g., the user's voice), and outputs a sound signal representing the sound to the sound IC 68. The sound IC 68 performs A/D conversion on the sound signal from the microphone 69 to output sound data in a predetermined format to the codec LSI 66.

The infrared communication module 72 emits an infrared signal to perform infrared communication with another device. Here, for example, the infrared communication module 72 has the function of performing infrared communication in accordance with the IrDA standard and the function of outputting an infrared signal to control the television 2.

The codec LSI 66 transmits image data from the camera 56, sound data from the microphone 69, and terminal operation data from the UI controller 65 to the game apparatus 3 via the wireless module 70. In the present example embodiment, the codec LSI 66 subjects the image data and the sound data to a compression process as the codec LSI 27 does. The terminal operation data, along with the compressed image data and sound data, is outputted to the wireless module 70 as transmission data. The antenna 71 is connected to the wireless module 70, and the wireless module 70 transmits the transmission data to the game apparatus 3 via the antenna 71. The wireless module 70 has a similar function to that of the terminal communication module 28 of the game apparatus 3. Specifically, the wireless module 70 has a function of connecting to a wireless LAN by a scheme in conformity with the IEEE 802.11n standard, for example. Data to be transmitted may or may not be encrypted depending on the situation.

As described above, the transmission data to be transmitted from the terminal device 7 to the game apparatus 3 includes operation data (terminal operation data), image data, and sound data. In the case where another device is connected to the terminal device 7 via the expansion connector 58, data received from that device may be further included in the transmission data. The codec LSI 66 may transmit data received via infrared communication by the infrared communication module 72 to the game apparatus 3, along with the aforementioned transmission data, where appropriate.

As described above, compressed image data and sound data are transmitted from the game apparatus 3 to the terminal device 7. These data items are received by the codec LSI 66 via the antenna 71 and the wireless module 70. The codec LSI 66 decompresses the received image data and sound data. The decompressed image data is outputted to the LCD 51, and images are displayed on the LCD 51. The decompressed sound data is outputted to the sound IC 68, and the sound IC 68 outputs sound from the speakers 67.

Also, in the case where control data is included in the data received from the game apparatus 3, the codec LSI 66 and the UI controller 65 give control instructions to various sections in accordance with the control data. As described above, the control data is data representing control instructions for the components of the terminal device 7 (in the present example embodiment, the camera 56, the touch panel controller 61, the marker section 55, sensors 62 to 64, the infrared communication module 72, and the vibrator 79). In the present example embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 7 to the game apparatus 3. Note that the marker section 55 is configured by infrared LEDs, and therefore is simply controlled for power supply to be ON/OFF.

Furthermore, the game apparatus 3 is capable of controlling output of the infrared communication module 72, thereby controlling the operation of the television 2. Specifically, the game apparatus 3 outputs an instruction (control data as mentioned above) to the terminal device 7, thereby causing the infrared communication module 72 to output an infrared signal corresponding to a control command for controlling the television 2. In response to this instruction, the codec LSI 66 causes the infrared communication module 72 to output an infrared signal corresponding to the control command. Here, the television 2 includes an infrared light reception section capable of receiving the infrared signal. By the infrared light reception section receiving the infrared signal outputted by the infrared communication module 72, the television 2 operates in accordance with the infrared signal. Note that the instruction from the game apparatus 3 may indicate the pattern of the infrared signal, or when the terminal device 7 has the infrared signal pattern stored therein, the game apparatus 3 may provide an instruction to indicate the pattern.

While the terminal device 7 includes operating means such as the touch panel 52, the analog sticks 53 and the operation button group 54, as described above, in another example embodiment, other operating means may be included in place of or in addition to these operating means.

Also, while the terminal device 7 includes the magnetic sensor 62, the acceleration sensor 63 and the gyroscope 64 as sensors for calculating the movement of the terminal device 7 (including its position and attitude or changes in its position and attitude), in another example embodiment, only one or two of the sensors may be included. Furthermore, in another example embodiment, any other sensor may be included in place of or in addition to these sensors.

Also, while the terminal device 7 includes the camera 56 and the microphone 69, in another example embodiment, the terminal device 7 may or may not include the camera 56 and the microphone 69 or it may include only one of them.

Also, while the terminal device 7 includes the marker section 55 as a feature for calculating the positional relationship between the terminal device 7 and the controller 5 (e.g., the position and/or the attitude of the terminal device 7 as seen from the controller 5), in another example embodiment, it may not include the marker section 55. Furthermore, in another example embodiment, the terminal device 7 may include another means as the aforementioned feature for calculating the positional relationship. For example, in another example embodiment, the controller 5 may include a marker section, and the terminal device 7 may include an image pickup element. Moreover, in such a case, the marker device 6 may include an image pickup element in place of an infrared LED.

5. Content Playback

Next, an operation of content playback performed in the game system 1 will be described. The game system 1 uses two display devices, i.e., the television 2 and the terminal device 7, to present, to users, content items obtained from a network such as the Internet in an easy-to-view, easy-to-operate manner.

Figure 11:
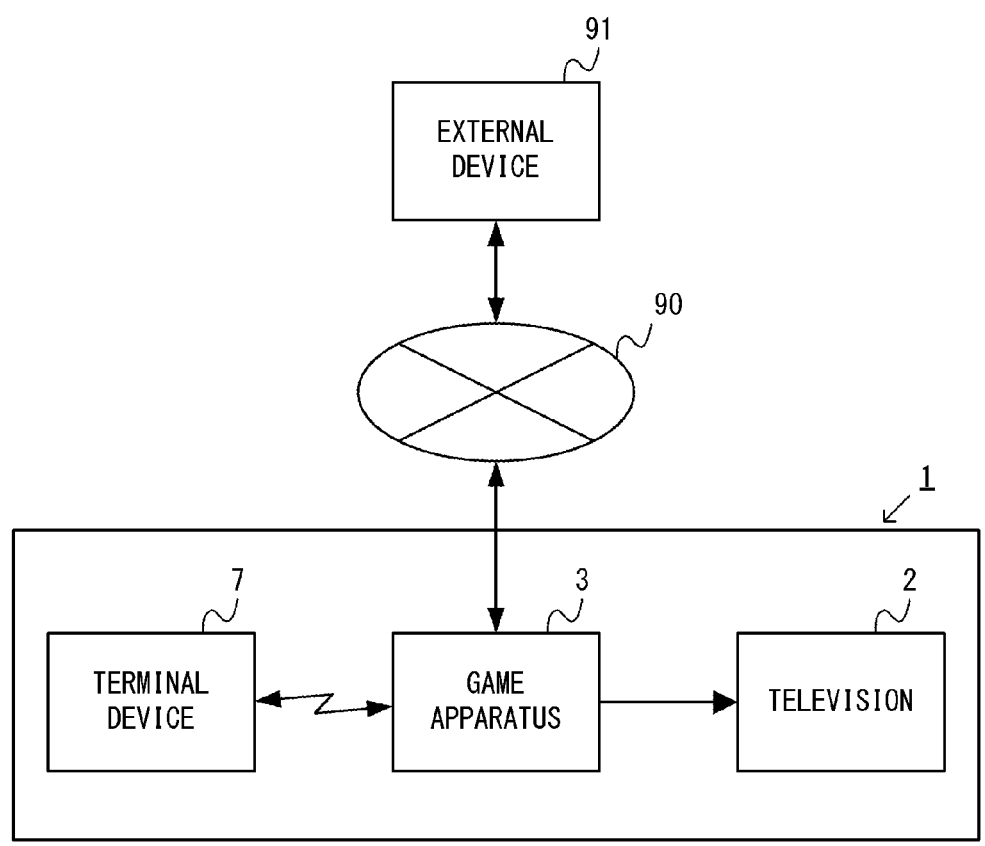
FIG. 11 is a block diagram showing an example of how a game system 1 and an external device are connected together.

FIG. 11 is a block diagram showing how the game system 1 and an external device are connected with each other. As shown in FIG. 11, the game apparatus 3 in the game system 1 is capable of communicating with an external device 91 via a network 90. The network 90 is any communication network such as the Internet. The external device 91 is typically a content (videos, still images, etc.) providing website or a content search website (e.g., a website where videos are stored, or a website where videos are searched for). The game apparatus 3 constructs a user interface for specifying a content item to be played based on the information obtained from the external device 91 via the network 90. More specifically, a user interface image (hereinafter referred to as a "UI image") is produced based on the information. More specifically, the game apparatus 3 obtains webpage information from the external device 91 to produce the UI image. Specifically, examples of the UI image include:

an image of a list of content items that can be played,
an image for inputting a condition (a keyword, etc.) for searching for a content item, and
an image of a list of search results.

The UI image is displayed on the terminal device 7. As will be described below, the UI image may be displayed on the television 2.

The game apparatus 3 not only produces a UI image based on webpage information obtained from the external device 91, but also performs an input/output control for specifying a content item to be played, e.g., accepting an input from a touch panel or another input unit to perform a process associated with the input.

When a content item to be played is specified by the user while the UI image is displayed on the terminal device 7, the game apparatus 3 obtains the specified content item from the external device 91 or another server. Then, the obtained content item is played to display the playback image on the television 2.

Thus, while the terminal device 7 can be used as a terminal for specifying a content item to be played, it can also be used as a terminal for viewing a content item. The former is referred to as the search mode, and the latter as the playback mode. To "search" as used herein means not only to input a keyword or the like to obtain search results, but also to simply search for a desired content item from a list of content items.

The playback mode is a mode in which the same content item is displayed on the screen of the terminal device 7 as that on the television 2. On the other hand, the search mode is a mode in which such a webpage as described above is displayed on the screen of the terminal device 7, and a content item to be played next is specified. In the embodiment to be described later, the content playback image is displayed and the webpage (UI image) is not displayed in the playback mode, whereas the webpage is displayed and the content playback image is not displayed in the search mode (i.e., the playback image or the UI image is displayed selectively). However, in an alternative example, the webpage may be displayed in a small size in the playback mode. More specifically, in the playback mode, the webpage may be displayed smaller than the content playback image, or the webpage in the playback mode may be displayed smaller than the display size of the webpage in the search mode. The content playback image may be displayed in a small size in the search mode. More specifically, in the search mode, the content playback image may be displayed smaller than the webpage image, or the content playback image in the search mode may be displayed smaller than the display size of the playback image in the playback mode. That is, a display suitable for viewing the content item being currently played may be used in the playback mode, while using a display suitable for specifying a content item to be played next in the search mode.

While a content item is played, the terminal device 7 may switch between the playback mode and the search mode at any point in time any number of times. Therefore, by switching the terminal device 7 to the search mode while a content item is played, it is possible to specify a content item to be played next using the terminal device 7 while other people are enjoying a content item on the television 2. If the playback of a content item is still continuing after a content item to be played next is specified in the search mode as described above, the mode is switched back to the playback mode and the content playback image is displayed on the terminal device 7 so that the user can enjoy the same content item being enjoyed on the television 2 by other people. Even after the terminal device 7 transitions to the search mode, the content playback continues on the television 2. When the terminal device 7 once transitions to the search mode and then switches back to the playback mode, the playback image displayed on the terminal device 7 is synchronized with the playback image on the television 2 (i.e., the same frame of the same scene is displayed). That is, when the terminal device 7 is used in the playback mode, the video playback on the television 2 and that on the terminal device 7 are synchronized with each other. That is, the same frame of the same scene of a video is displayed on the television 2 and on the terminal device 7.

With such a configuration, the operator of the terminal device 7 can freely switch, at any point in time, between the backstage role of determining a content item to be viewed by other people on the television 2 and enjoying the content item together with the other people.

More specifically, in the present embodiment, such images as shown in FIG. 12 to FIG. 18 are displayed on the television 2 and the terminal device 7.

Figure 12:
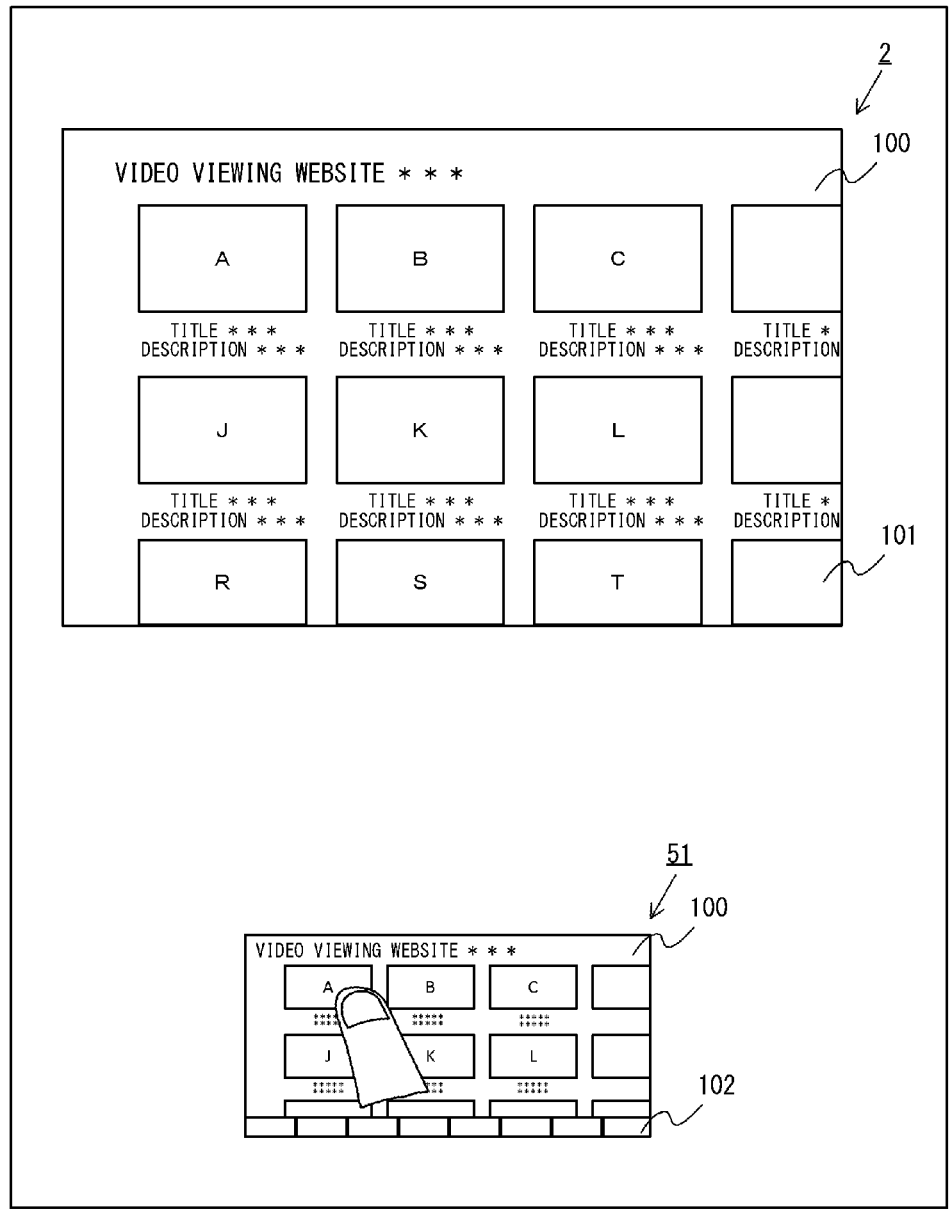
FIG. 12 is a screen example of a television 2 and a screen 51 of a terminal device 7 (when no content item is being played)

FIG. 12 shows images displayed on the television 2 and (the screen 51 of) the terminal device 7 when no content item is being played. When no content item is being played, the terminal device 7 is set in the search mode. The game apparatus 3 obtains webpage data from a video website to produce and display a webpage image 100 on the television 2 and on the terminal device 7. In the present embodiment, the webpage image is displayed full screen. The webpage image 100 includes a UI image for specifying a content item to be played. Specifically, in the present embodiment, the webpage image 100 includes a list of thumbnails 101 of content items that can be obtained from the video website. The game apparatus 3 also performs an input control based on the webpage data obtained from the video website.

In addition to the webpage image 100 obtained from the video website, a group of buttons 102 including various buttons for triggering various functions as an internet browser are displayed on the terminal device 7. The buttons included in the group of buttons 102, when touched, trigger the following functions, for example.

Back button: display a previous website in browsing history

Forward button: display a next website in browsing history

Enlarge/shrink button: enlarge/shrink website being displayed

Favorite button: display/edit/add list of favorites

Reload button: reload website being displayed

Tab button: display list of tabs that are open Television display stop button: temporarily turn off display of webpage image on television 2

Menu button: display list of menu items

The group of buttons 102 are not displayed on the television 2.

As described above, the same webpage is displayed on the television 2 and on the terminal device 7. The television display stop button is used when the operator does not want the viewers of the television 2 to see the particular scene (e.g., when the operator is entering a password on the terminal device 7) or when the operator does not want the viewers of the television 2 to see the process of specifying a content item. By selecting (more specifically touching) this button, the display of the webpage image 100 on the television 2 is turned off, and a predetermined text message or image is displayed instead. Each time the television display stop button is operated, the mode is repeatedly switched between one mode in which the webpage image 100 is displayed on the television 2 (the television display mode) and another mode in which the webpage image 100 is not displayed on the television 2 (the television display off mode). Even when the mode is set to the television display mode, the content playback image is displayed and the webpage image 100 is not displayed on the television 2 while a content item is being played.

It is possible to scroll the webpage image 100 by making a sliding touch on the screen of the terminal device 7. Then, the webpage image 100 on the television also scrolls similarly.

With the terminal device 7, in addition to the functions triggered by the group of buttons 102, one can select data such as text or an image in the webpage, scroll the webpage image 100 vertically or horizontally, or enlarge/shrink the webpage image 100, using a touch panel, a cross-shaped key, a slide stick or a gyroscopic function. One can also change the content of display on the television 2. One can also input text such as an URL.

The function of scrolling the webpage image, etc., triggered by the group of buttons 102 or by a sliding touch are implemented by a browser program stored in the game apparatus (not by the webpage information obtained from the video website).

Figure 13:
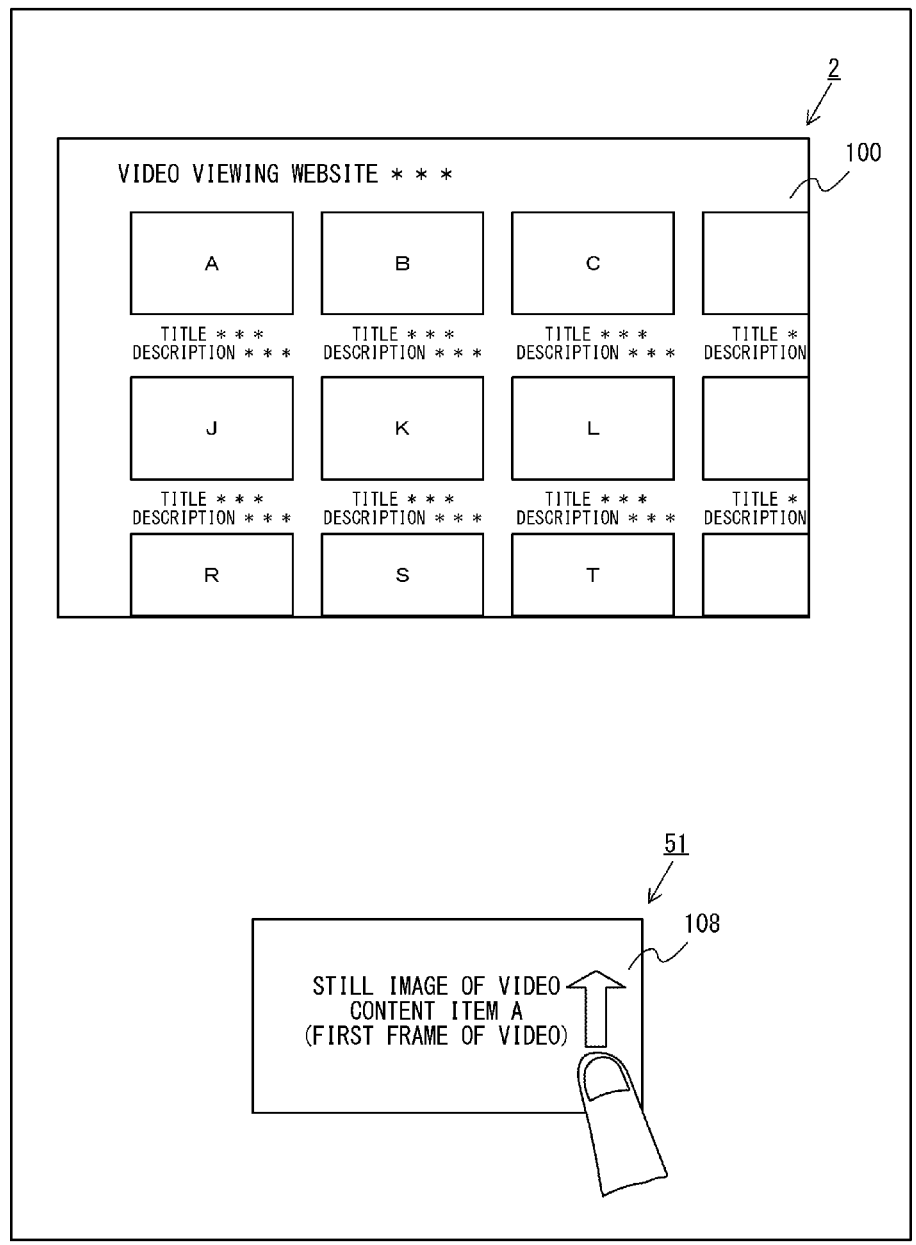
FIG. 13 is a screen example of the television 2 and the screen 51 of the terminal device 7 (when starting playback of a content item)
Figure 14:
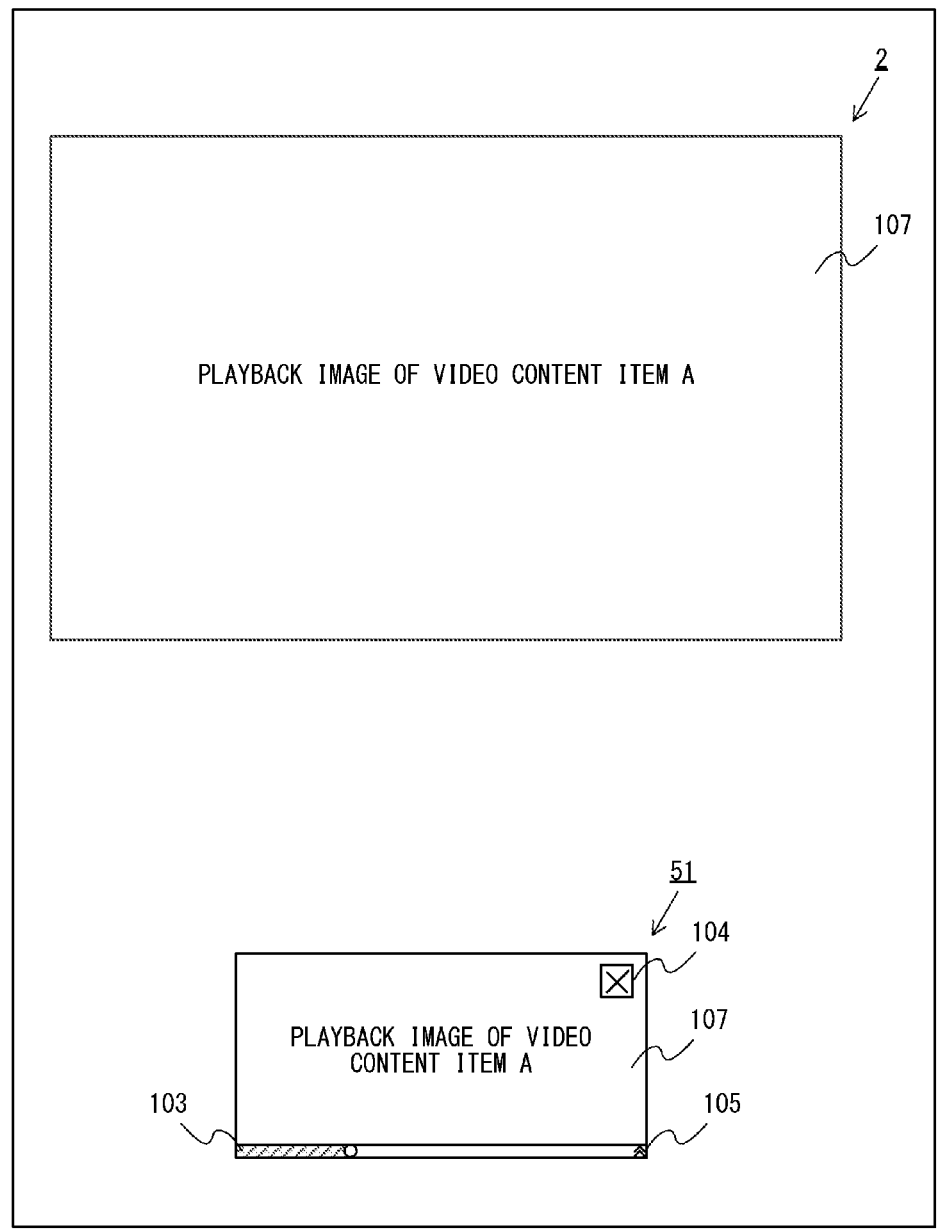
FIG. 14 is a screen example of the television 2 and the screen 51 of the terminal device 7 (when a content item is being played)

A content item to be played is specified by touching a thumbnail of a content item on the webpage image 100 displayed on the terminal device 7. For example, FIG. 12 shows a state where the thumbnail of content item A is touched. When the thumbnail of a content item is touched, a still image 108 representing the specified content item (e.g., an enlarged image of the thumbnail or the image of the first frame of the video) is displayed on the terminal device 7 as shown in FIG. 13. In this state, if one makes a sliding touch in the upward direction (or makes a sliding touch in the upward direction and then lifts the finger off the screen) on the screen of the terminal device 7 (or on the still image), the playback of the content item starts, and a content playback image 107 is displayed both on the television 2 and on the terminal device 7 as shown in FIG. 14. Then, the terminal device 7 automatically transitions to the playback mode. Then, in the present embodiment, the playback image 107 is displayed full screen on the television 2. In the present embodiment, a playback control UI 103 to be described later is not displayed on the television 2.

As described above, a content item is first displayed, as a still image, on the terminal device 7, and the playback thereof is started on the television 2 triggered by a sliding touch in the upward direction. Thus, it is possible to provide a user experience where the user feels as if a content item on the terminal device 7 were shooting up into the television 2 to be played therein. The playback of a content item may be triggered simply by a touch on a thumbnail of the content item.

As shown in FIG. 14, in the playback mode, the playback control UI 103 (fast forward/rewind/skip/pause) is displayed at the lower end of the screen of the terminal device 7 (under the content playback image 107). In the present embodiment, the playback control UI 103 is a bar-shaped UI, and changes in the color of the bar represents the proportion between the played portion and the un-played portion of the whole content item. The playback control UI 103 also has the function of showing how much of the video being played has been played. Thus, the playback control UI 103 is an image representing the playback status of a content item being played. It is possible to perform a control operation such as fast forward by touching any position along the bar or the marker at the boundary between the played portion and the un-played portion. That is, the playback control UI 103 is an image for controlling the playback of a content item being played. The playback control UI 103 may include both, or one of, the image representing the playback status of a content item being played and the image for controlling the playback of a content item being played. For example, the playback control UI 103 may include an image representing the playback time as an image representing the playback status, or a button image for instructing to start the playback or to pause as an image for controlling the playback. Moreover, in the playback mode, a button 104 for ending the playback of a content item, a button 105 for switching the terminal device 7 from the playback mode to the search mode are displayed on the terminal device 7, and these UI components and buttons are touched to activate processes associated therewith.

The functions of the playback control UI 103 and the buttons 104 and 105 are implemented by a browser program stored in the game apparatus (not by the webpage information obtained from the video website).

Figure 15:
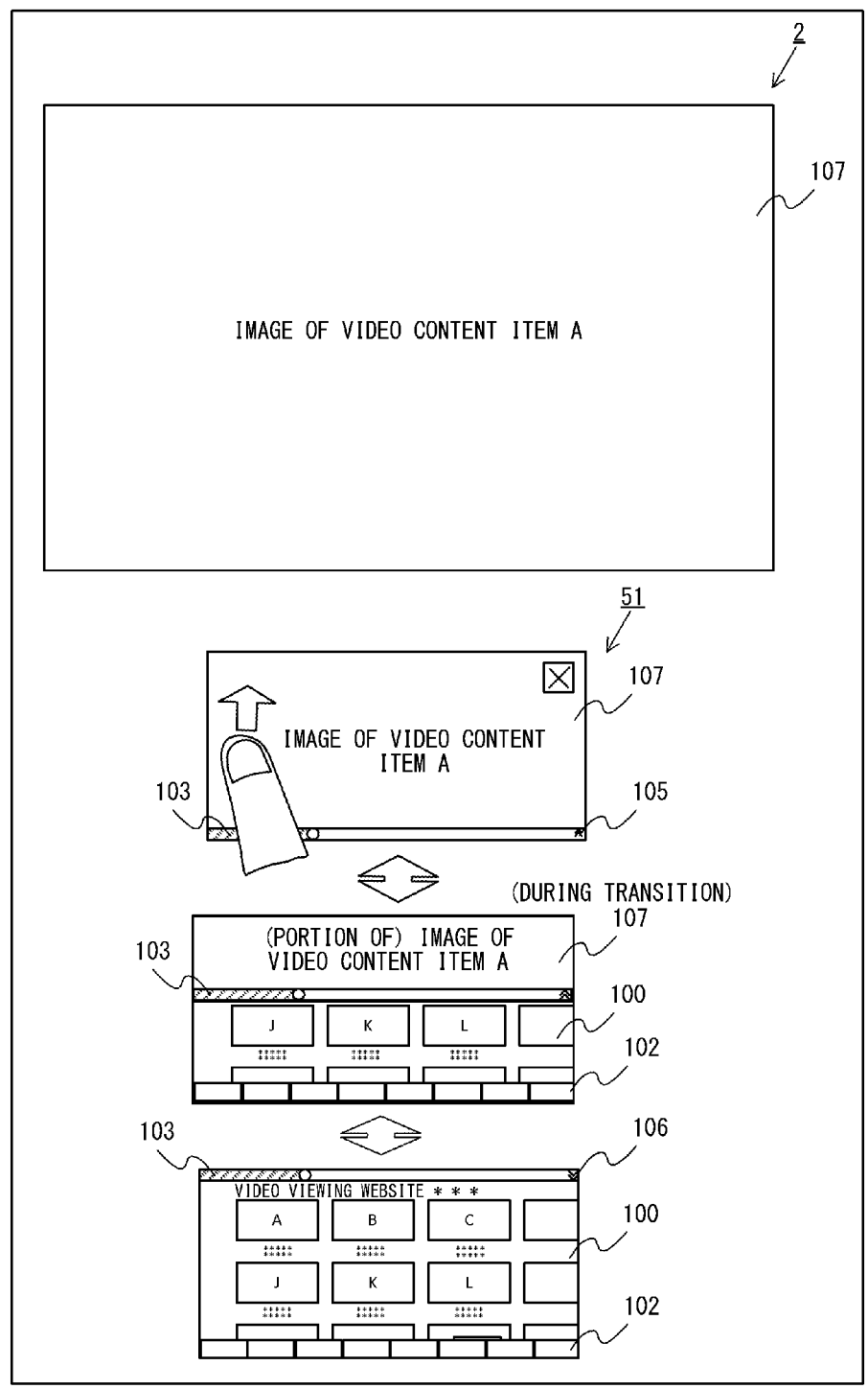
FIG. 15 is a screen example of the television 2 and the screen 51 of the terminal device 7 (switching between playback mode and search mode while a content item is being played)

FIG. 15 is a diagram showing the transition from the playback mode to the search mode or the transition from the search mode to the playback mode while a content item is being played. The transition from the playback mode to the search mode may be triggered by a touch on the button 105 as described above. In addition, the terminal device 7 transitions from the playback mode to the search mode also by making a sliding touch in the upward direction (or making a sliding touch in the upward direction and then lifting the finger off the screen) on the screen of the terminal device 7 (or on the content playback image). In the search mode while a content item is being played, a button 106 is displayed as shown in FIG. 15, and the transition from the search mode to the playback mode is triggered by a touch on the button 106.

As shown in FIG. 15, when a transition from the playback mode to the search mode is instructed, the content playback image 107 gradually slides in the upward direction to disappear while the webpage image 100 gradually appears into the screen of the terminal device 7. When a transition from the search mode to the playback mode is instructed, the content playback image 107 gradually slides in from the upward direction.

Figure 16:
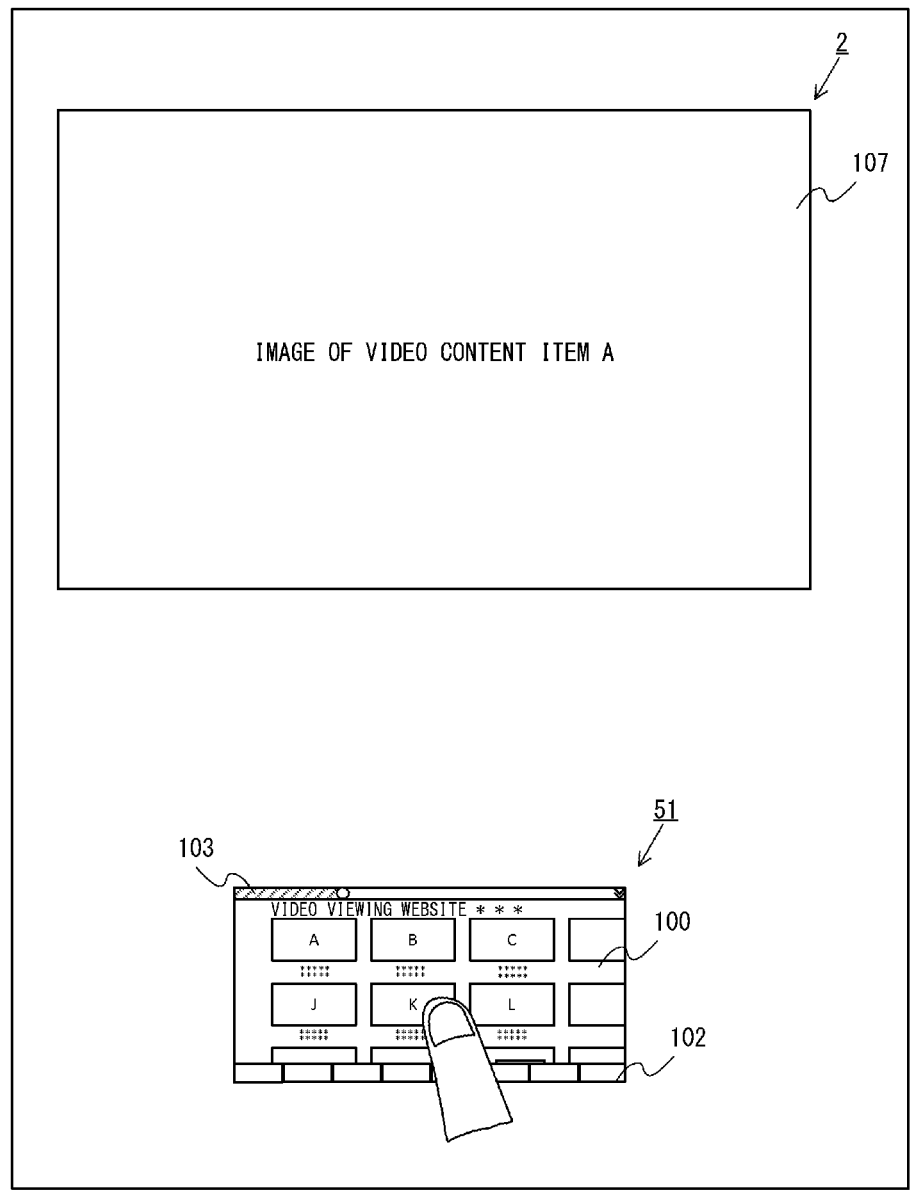
FIG. 16 is a screen example of the television 2 and the screen 51 of the terminal device 7 (an operation of determining a content item to be played next while a content item is being played)

When the mode is transitioned to the search mode while a content item is being played, the playback control UI 103 is displayed, in addition to the webpage image 100, on the terminal device 7 as shown in FIG. 16. While the playback control UI 103 is displayed at the lower end of the screen or under the content playback image as shown in FIG. 14 in the playback mode, the playback control UI 103 is displayed at the upper end of the screen or above the webpage as shown in FIG. 16 in the search mode.

Also in the search mode while a content item is being played, as in the search mode while no content item is being played (FIG. 12), one can specify a content item to be played by specifying a thumbnail, or the like, on the webpage. FIG. 16 shows a state where a thumbnail of video content item K is touched. When the thumbnail of a content item is touched (or a sliding touch in the upward direction is made thereon as described above with reference to FIG. 13), the playback of the touched content item (video content item K) starts both on the television 2 and on the terminal device 7, as shown in FIG. 14. Then, the terminal device 7 automatically transitions to the playback mode.

Figure 17:
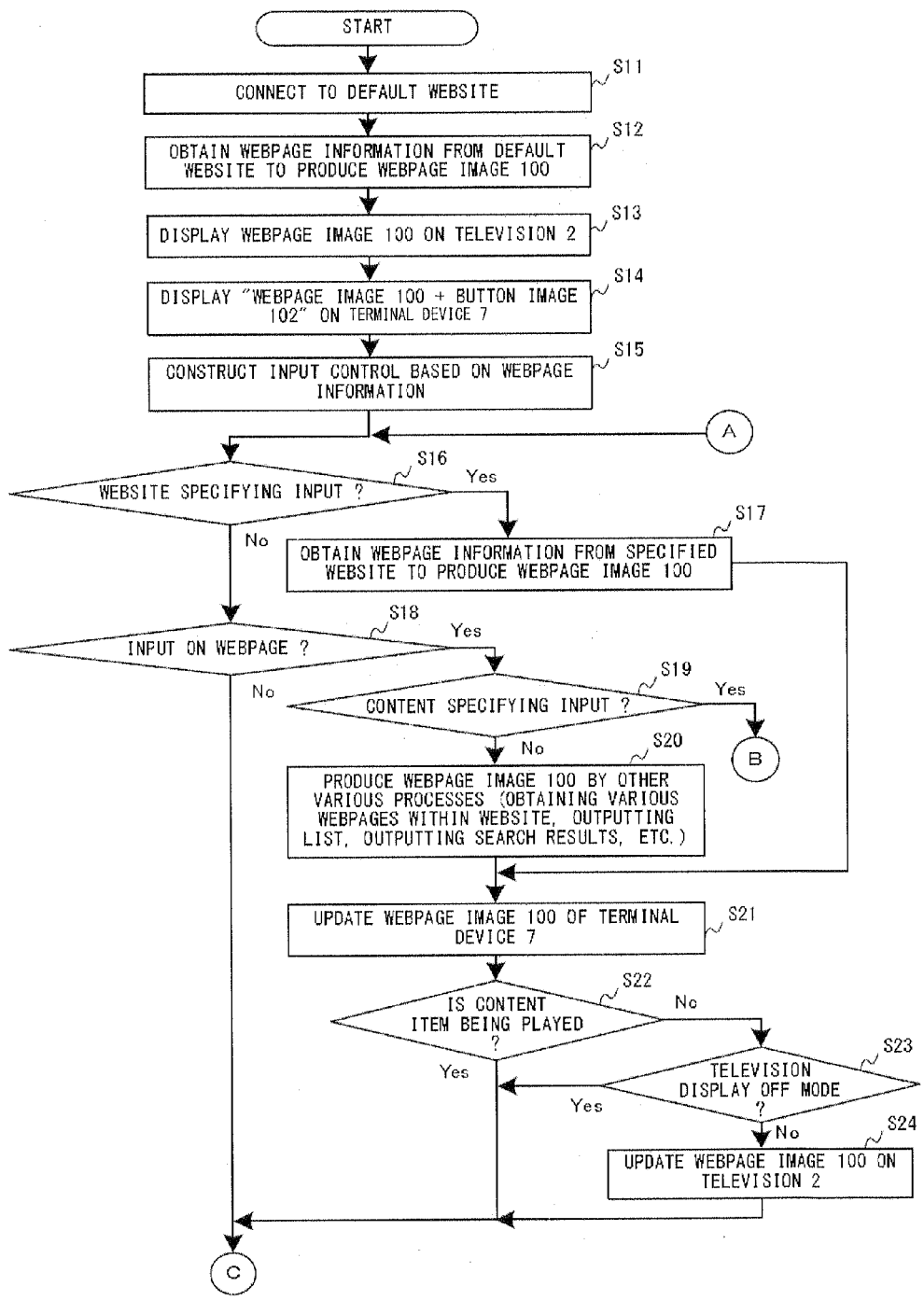
FIG. 17 is an example of a main flow chart showing a process flow.
Figure 18:
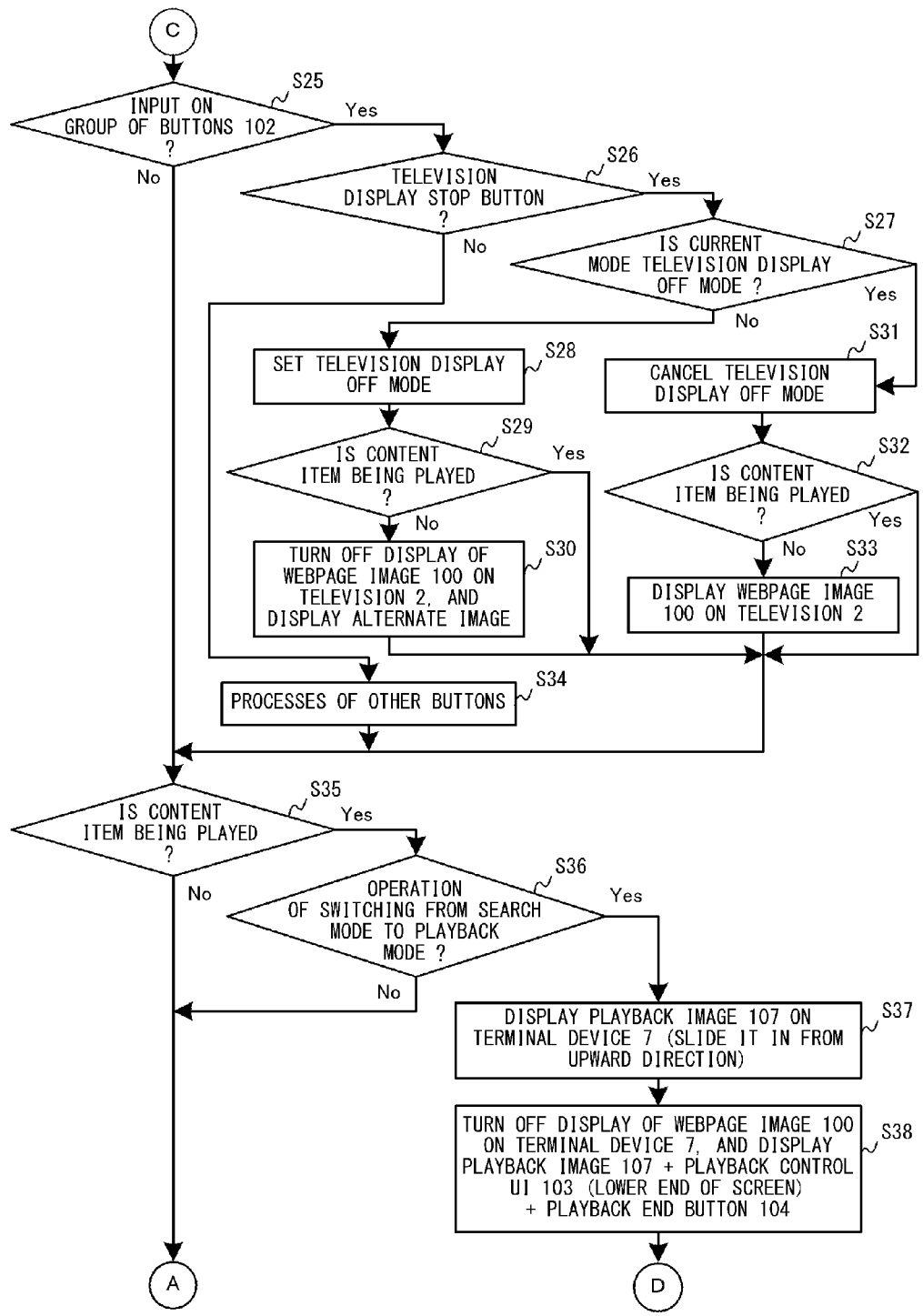
FIG. 18 is an example of a main flow chart showing a process flow.
Figure 19:
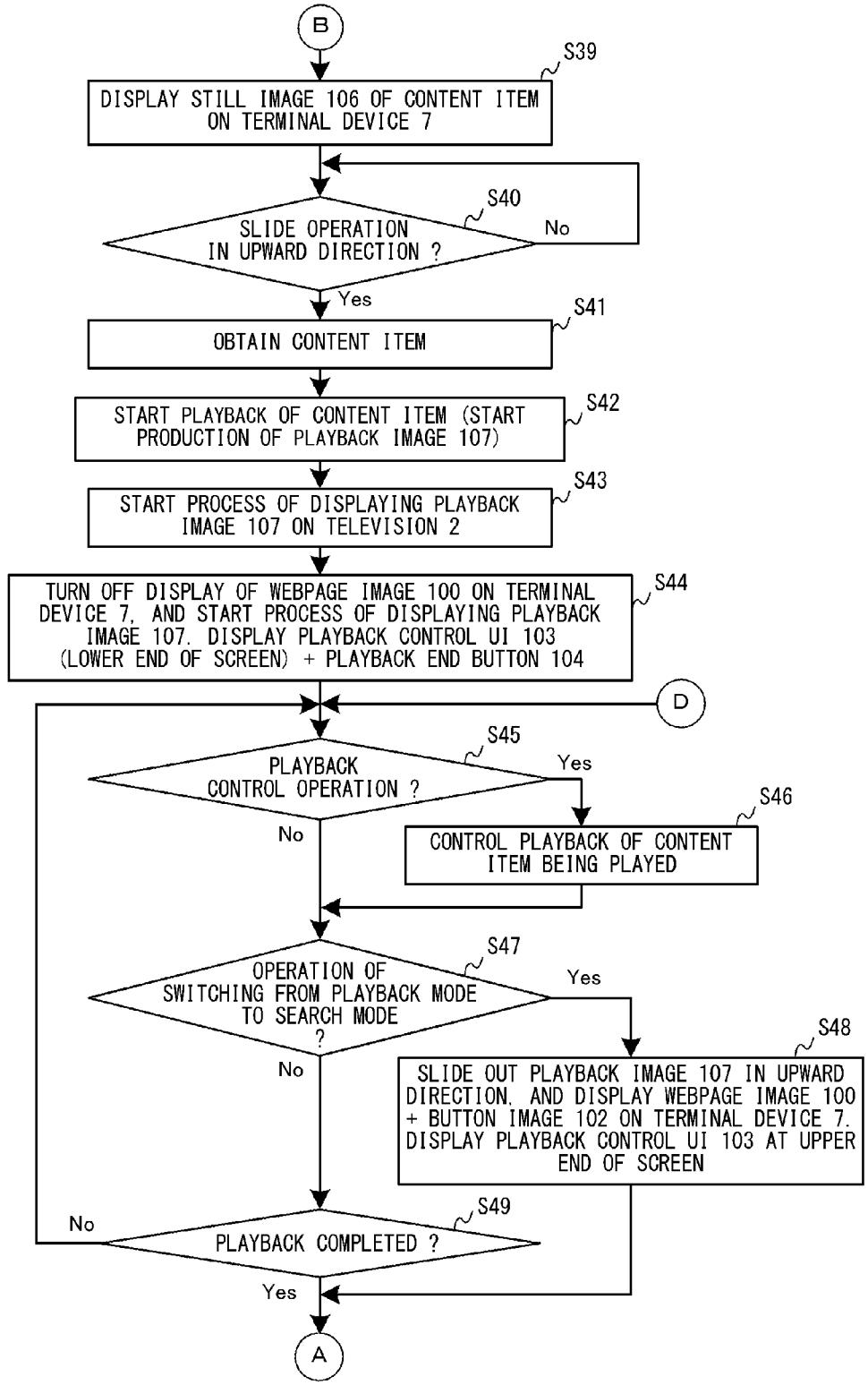
FIG. 19 is an example of a main flow chart showing a process flow.

FIG. 17 to FIG. 19 show a flow chart showing process operations of the game apparatus 3. The process steps shown in this flow chart are implemented by the CPU 10 executing a program (a browser program) stored in a non-volatile memory of the game apparatus 3 or on the optical disc 4.

First, referring to FIG. 17, in step S11, the game apparatus 3 connects to a default website, and obtains webpage information to produce the webpage image 100 in step S12.

As shown in FIG. 12 discussed above, the webpage image 100 is displayed on the television 2 in step S13, and the webpage image 100 and the button images 102 are displayed on the terminal device 7 in step S14 (the webpage image data produced by the game apparatus 3 is transmitted to the terminal device 7 by the wireless function described above, and the terminal device 7 receives the data and displays the image on the screen. In this flow chart, images are displayed on the screen of the terminal device 7 in a similar manner). Moreover, an input control is constructed based on the webpage information obtained in step S12. Thus, an input control on the webpage is performed (step S18 to be described later).

After step S15, in step S16, a website specifying input is accepted. More specifically, an address input of a video website is accepted. A website may be selected using a function such as the favorites function. When there is a website specifying input in step S16, webpage information is obtained from the specified website to produce the webpage image 100 in step S17.

After step S17, in step S21, the webpage image 100 produced in step S17 is displayed on the terminal device 7. Then, it is determined in step S22 whether a content item is being played, and it is determined in step S23 whether the mode is the television display off mode. If no content item is being played and the mode is not the television display off mode, the webpage image 100 produced in step S17 is displayed on the television 2 in step S24.

If there is no website specifying input in step S16, it is determined in step S18 whether there has been an input on the webpage. This is determined based on the input control settings constructed in step S15 described above. For example, it is determined whether a link, a button, a thumbnail image, or the like, on the webpage has been specified by a touch thereon, for example.

If it is determined in step S18 that there has been an input on the webpage, it is determined in step S19 whether there has been a content specifying input. More specifically, it is determined whether a thumbnail image in a list of content items has been specified by a touch thereon, for example. When a content item is specified, control transitions to step S39, which will be described later.

If it is determined in step S19 that the input on the webpage is not a content specifying input, the webpage image 100 is produced in step S20 by obtaining various webpage information within the website, obtaining a list of content items, obtaining search results, etc. After the webpage image 100 is produced in step S20, the produced webpage image 100 is displayed on the terminal device 7 as described above with reference to step S21 to step S24, and it is displayed also on the television 2 if no content item is being played and if the mode is not the television display off mode.

Next, referring to FIG. 18, it is determined in step S25 whether there has been an input on the group of buttons 102. As described above, the group of buttons 102 include various buttons, and it is determined in step S26 whether the television display stop button has been specified by a touch thereon, etc. If the television display stop button has been specified, it is determined in step S27 whether the current mode is the television display off mode. If the mode is not the television display off mode, the mode is set to the television display off mode, and if no content item is being played, the display of the webpage image 100 on the television 2 is turned off, and an alternative image such as a text message or image is displayed on the television 2 in step S30. If the current mode is the television display off mode, the television display off mode is canceled, and if no content item is being played, the webpage image 100 is displayed on the television 2 in step S33. If it is determined in step S26 that the button is another button, a process associated with that button is performed in step S34.

Next, it is determined in step S35 whether a content item is being played, and if no content item is being played, control returns to step S16 to repeat a similar process.

If it is determined, in step S19 described above, that there has been a content specifying input, control transitions to step S39 (see FIG. 19). In step S39, the still image 108 of the content item is displayed on the terminal device 7. Then, if it is determined in step S40 that there has been a slide operation in the upward direction on the still image, content data is obtained from the video website in step S41, and the playback of the content item is started in step S42 by starting to produce the playback image. If a content item is being played, the playback of a newly specified content item may be started while discontinuing the playback of the current content item, or the playback of the newly specified content item may be started after the completion of the playback of the current content.

Even after step S42, the process of playing the content item to produce the playback image is performed continuously until the completion of the playback.

After step S42, in step S43, the process of displaying the playback image 107 on the television 2 is started. Even after step S43, the process of displaying the content playback image 107 on the television 2 is performed continuously until the completion of the playback.

After step S43, in step S44, as for the image displayed on the terminal device 7, the webpage image 100 is deleted and the process of displaying the playback image 107 is started. The playback control UI 103 and the playback end button 104 are superimposed on the terminal device 7 (see FIG. 14). The playback control UI 103 is displayed so as to be located at the lower end of the screen of the terminal device 7 or under the playback image 107.

After step S44, in step S45, it is determined whether a playback control operation has been made. Specifically, it is determined whether there has been a touch operation on the playback control UI 103 or the playback end button 104. If there has been such an operation, a playback control associated therewith is performed in step S46.

After step S45, in step S47, it is determined whether there has been an operation of switching from the playback mode to the search mode. More specifically, in the present embodiment, it is determined whether there has been a touch on the button 105, or whether there has been a slide operation in the upward direction on the screen of the terminal device 7 (or on the content playback image) as described above.

If it is determined in step S47 that there has been an operation of switching from the playback mode to the search mode, the playback image 107 slides out in the upward direction on the screen of the terminal device 7, and instead the webpage image 100 (a webpage image that has been produced most recently and stored), the group of buttons 102 and the playback control UI are displayed in step S48. The playback control UI is displayed so as to be located at the upper end of the screen or above the content playback image. Thus, the operator of the terminal device 7 can specify a new content item to be played from the list of content items, and to obtain a new list of content items. After step S48, control returns to step S16 to repeat the process.

After the mode is switched to the search mode while a content item is being played, the mode can be switched back to the playback mode as long as the playback of the content item is still continuing. Specifically, if it is determined in step S35 that a content item is being played, and it is determined in step S36 that there has been an operation of switching from the search mode to the playback mode, the most-recently produced playback image 107 (the playback image being displayed on the television 2) is displayed on the terminal device 7 in steps S37 and S38. When there is a switching operation, the playback image 107 is displayed as if it were gradually sliding from the upward direction into the screen of the terminal device 7. Then, the webpage image 100 is no longer displayed on the terminal device 7, with the playback image 107, the playback control UI 103 and the playback end button 104 displayed on the terminal device 7. The playback control UI 103 is displayed so as to be located at the lower end of the screen or under the playback image 107.

After step S47, in step S49, it is determined whether the content playback has been completed (whether it has been played to the last frame). If so, control returns to step S16 to repeat the process. Then, if the terminal device 7 is in the playback mode, the webpage image produced most recently and stored may be displayed. The last scene of the content item may be left displayed on the television 2, or a webpage image similar to that on the terminal device 7 may be displayed on the television 2.

6. Variations

The embodiment above is merely an example, and the information processing system, etc., may be implemented with a configuration to be described below, for example, in other embodiments.

Although content data is obtained via a network in the embodiment above, many pieces of content data may be stored in the game apparatus and a content item to be played may be specified therefrom for playback.

In the above example embodiments, the terminal device 7, rather than the controller 5, is used as an operating device. Accordingly, the game system 1 may be configured to include no controller 5. However, in another example embodiment, the controller 5, along with the terminal device 7, may be used as an operating device. Specifically, the CPU 10 may acquire operation data (controller operation data) representing an operation with the controller 5, and perform information processing related to a video displayed on the television 2, on the basis of the operation data. For example, in the case where the television 2 displays a video, the controller 5 may be used to perform an operation to play or pause the video. Thus, not only the user holding the terminal device 7 but also another user with the controller 5 can perform an operation related to the video displayed on the television 2, ensuring enhanced user-friendliness.

In the above example embodiments, the game system 1 includes only one terminal device 7, but the game system 1 may be configured to include more than one terminal device. Specifically, the game apparatus 3 may be capable of wirelessly communicate with a plurality of terminal devices, so that image data can be transmitted to each terminal device, and operation data, camera image data, and microphone audio data can be received from each terminal device. In addition, each terminal device may display a different operation image, and may individually perform their operations to display images on the television 2. Note that, when wirelessly communicating with terminal devices, the game apparatus 3 may perform the wireless communication with the terminal devices using a time-division or frequency-band-division system.

Furthermore, each terminal device may have the function of outputting operation data to a game apparatus, receiving images from the game apparatus, and displaying the received images. Specifically, in another example embodiment, each terminal device may be a device, such as a hand-held game device, which has the function of, for example, executing predetermined information processing (game processing) by a predetermined program (game program).

While the above example embodiments have been described with respect to examples where images (video and/or still images) are outputted to the television 2, the game system 1 can be configured such that sound, rather than an image, is outputted to the television 2 (the speakers 2a of the television 2). Specifically, the game apparatus 3 may receive audio (e.g., music) data from the external device 91 via the network 90, and output the audio data to the speakers 2a. In this case, the terminal device 7 displays an operation image for use in performing an operation related to audio. In addition, the CPU 10 executes information processing related to audio on the basis of terminal operation data. Note that, in general, the television 2 can output higher-quality sound than the terminal device 7 of portable type, and therefore, in the above case, by the television 2 outputting audio acquired from the external device 91, the user can enjoy listening to higher-quality sound.

In the above example embodiments, a series of information processing tasks to be performed in the game system 1 are executed by the game apparatus 3, but the series of information processing tasks may be executed in part by another device. For example, in another example embodiment, a part (e.g., the terminal game image generation process) of the series of information processing tasks may be performed by the terminal device 7. Moreover, in another example embodiment, a series of information processing tasks in a game system including a plurality of information processing apparatuses capable of communicating with each other may be shared between the information processing apparatuses. Note that in the case where information processing is shared between information processing apparatuses, processing tasks are synchronized between the information processing apparatuses, resulting in complicated processing. On the other hand, in the case where, as in the above embodiments, information processing is executed by one game apparatus 3, and the terminal device 7 receives and displays images (i.e., the terminal device 7 is a thin-client terminal), processing tasks are not synchronized between information processing apparatuses, resulting in simplified processing.

Furthermore, wile the above example embodiments have been described taking as an example the game system 1 which includes the game apparatus 3 capable of performing game processing, the processing operations described in the above example embodiments can be performed not only by the game system and apparatus, but also by any arbitrary information processing system and apparatus. Any information processing system can be employed so long as it includes an information processing apparatus, and a portable display device (e.g., terminal device 7) allowing the user to perform input operations, and any information processing apparatus can be employed so long as it can output and display images on both a portable display device and a display device (e.g., television 2) different from the portable display device.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, (a) non-volatile memory, including by way of example semiconductor memory devices, such as Erasable Programmable Read-Only Memory (EPROM), Electrically Erasable Programmable Read-Only Memory (EEPROM), and flash memory devices; (b) magnetic disks such as internal hard disks and removable disks; (c) magneto-optical disks; and (d) Compact Disc Read-Only Memory (CD-ROM). Any of the foregoing may be supplemented by, or incorporated in, specially-designed Application Specific Integrated Circuits (ASICs).

The processing system/circuitry described in this specification is "programmed" to control processes such as game processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, the present example embodiment can be applied to, for example, a game system or apparatus for the purpose of, for example, providing images that can be viewed more readily and allowing the user to readily perform operations related to the images.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including a stationary display device, and a portable display device on which a predetermined input can be made by a user, comprising:
    a computer processing system, including at least one computer processor, the computer processing system being configured to provide functionality comprising:
        a content playback for playing a content item to thereby generate a playback image, and displaying the playback image at least on the stationary display device;
        a UI image generation for generating a user interface image used for specifying a content item to be played;
        a switching display control for alternatively displaying the playback image being played and the user interface image on the portable display device while a content item is being played by the content playback;
        a content specifying for specifying a content item to be played next based on a predetermined input made by the user on the portable display device using the user interface image, and
        a playback status display control for displaying, on the portable display device, a playback status image which represents a playback status of the content item being played by the content playback,
    wherein the content playback next plays the content item specified by the content specifying; and
    wherein the playback status display control displays, on the portable display device, the playback status image together with the playback image when display has been switched by the switching display control to the playback image being played, and displays, on the portable display device, the playback status image together with the user interface image when display has been switched by the switching display control to the user interface image.

2. The information processing system according to claim 1, wherein the playback status display control displays the playback status image below the playback image when display has been switched by the switching display control to the playback image being played, and displays the playback status image above the user interface image when display has been switched by the switching display control to the user interface image.

3. The information processing system according to claim 1, wherein:
    the portable display device includes a coordinate input; and
    the switching display control switches what is displayed on the portable display device from the playback image to the user interface image when a coordinate input representing an upward direction is made on the coordinate input.

4. The information processing system according to claim 1, wherein when switching from the user interface image to the playback image, the switching display control displays the playback image of the content item being currently played by the content playback so that the playback image gradually slides in from an upward direction on the portable display device.

5. The information processing system according to claim 1, wherein when switching from the playback image to the user interface image, the switching display control displays the playback image of the content item being currently played by the content playback so that the playback image gradually slides out in an upward direction on the portable display device.

6. The information processing system according to claim 1, wherein when playing a content item that has been specified by the content specifying to be played next, the content playback displays the playback image on the stationary display device, and switches display of the portable display device to the playback image by the switching display control to display the playback image on the portable display device.

7. The information processing system according to claim 1, wherein when playback of a content item by the content playback is completed, the switching display control displays the user interface image both on the portable display device and on the stationary display device.

8. The information processing system according to claim 1, wherein:
    the computer processing system is configured to provide functionality further comprising a communication that can be connected to a network for communicating with a predetermined external device storing content items therein via the network;
    the UI image generation obtains a list of content items stored in the external device via the communication to generate an interface image for specifying a content item to be played from among the list of content items; and
    the content playback obtains the content item specified by the content specifying from the external device via the communication to play the content item.

9. The information processing system according to claim 1, wherein:

the computer processing system is configured to provide functionality further comprising an information processing capable of generating display data and outputting the display data to the stationary display device and the portable display device;

the information processing provides functionality as the UI mage generation and the content playback;

the user interface image generated by the UI image generation and the playback image produced by the content playback are selectively or simultaneously output to the portable display device;

the playback image produced by the content playback is output to the stationary display device; and the stationary display device and the portable display device receive and display the display data from an information processing apparatus.

10. An information processing system including a stationary display device, and a portable display device on which a predetermined input can be made by a user, comprising:

a computer processing system, including at least one computer processor, the computer processing system being configured to provide functionality comprising:

a content playback for playing a content item to thereby generate a playback image, and displaying the playback image at least on the stationary display device;

a UI image generation for generating a user interface image used for specifying a content item to be played;

a switching display control for alternatively displaying the playback image being played and the user interface image on the portable display device while a content item is being played by the content playback; and a content specifying for specifying a content item to be played next based on a predetermined input made by the user on the portable display device using the user interface image, wherein:

the content playback next plays the content item specified by the content specifying; and the portable display device includes a coordinate input;

the computer processing system is configured to provide functionality further comprising a playback control display control for displaying, on the portable display device, a playback control image which is displayed for controlling the playback of the content item being played by the content playback;

the playback control display control displays, on the portable display device, the playback control image together with the playback image when display has been switched by the switching display control to the playback image being played, and displays, on the portable display device, the playback control image together with the user interface image when display has been switched by the switching display control to the user interface image; and the playback control performs a playback control on a content item being currently played when a coordinate input is made on the playback control image by the coordinate input.

11. The information processing system according to claim 10, wherein the playback control display control displays the playback control image below the playback image when display has been switched by the switching display control to the playback image being played, and displays the playback control image above the user interface image when display has been switched by the switching display control to the user interface image.

12. An information processing apparatus capable of outputting display data to a stationary display device and a portable display device on which a predetermined input can be made by a user, comprising:

a content playback device configured to play a content item to thereby generate a playback image, and display the playback image at least on the stationary display device;

a UI image generator configured to generate a user interface image used for specifying a content item to be played;

a switching display controller configured to alternatively display the playback image being played and the user interface image on the portable display device while a content item is being played by the content playback device;

a content specifier configured to specify a content item to be played next based on a predetermined input made by the user on the portable display device using the user interface image; and a playback status display controller configured to display, on the portable display device, a playback status image which represents a playback status of the content item being played by the content playback, wherein the content playback device next plays the content item specified by the content specifying; and wherein the playback status display controller is configured to display, on the portable display device, the playback status image together with the playback image when display has been switched by the switching display controller to the playback image being played, and display, on the portable display device, the playback status image together with the user interface image when display has been switched by the switching display controller to the user interface image.

13. A non-transitory computer-readable storage medium having stored thereon an information processing program to be executed by a computer of an information processing apparatus capable of outputting display data to a stationary display device and a portable display device on which a predetermined input can be made by a user, the information processing program causing the computer to execute:

playing a content item to thereby generate a playback image, and displaying the playback image at least on the stationary display device;

generating a user interface image used for specifying a content item to be played;

alternatively displaying the playback image being played and the user interface image on the portable display device while a content item is being played; and specifying a content item to be played next based on a predetermined input made by the user on the portable display device using the user interface image, displaying, on they portable display device, a playback status image which represents a playback status of the content item being played, wherein the specified content item is played next; and wherein the displaying of the playback status image displays, on the portable display device, the playback status image together with the playback image when display has been switched to the playback image being played, and displays, on the portable display device, the playback status image together with the user interface image when display has been switched to the user interface image.

14. A content playback control method to be executed in an information processing system including a stationary display device, and a portable display device on which a predetermined input can be made by a user, the method comprising:
  playing a content item to thereby generate a playback image, and displaying the playback image at least on the stationary display device;
  generating a user interface image used for specifying a content item to be played;
  alternatively displaying the playback image being played and the user interface image on the portable display device while a content item is being played; and
  specifying a content item to be played next based on a predetermined input made by the user on the portable display device using the user interface image:
  displaying, on the portable display device, a playback status image which represents a playback status of the content item being played,
  wherein the displaying of the playback status image displays, on the portable display device, the playback status image together with the playback image when display has been switched to the playback image being played, and displays, on the portable display device, the playback status image together with the user interface image when display has been switched to the user interface image.

15. An information processing apparatus capable of outputting display data to a stationary display device and a portable device on which a predetermined input can be made by a user, comprising:
  a content playback device configured to play a content item to thereby generate a a playback image, and display the playback image at least on the stationary display device;
  a UI image generator configured to generate a user interface image used for specifying a content item to be played;
  a switching display controller configured to alternatively display the playback image being played and the user interface image on the portable display device while a content item is being played by the content playback device;
  a content specifier configured to specify a content item to be played next based on a predetermined input made by the user on the portable display device using the user interface image; wherein
  the content playback device next plays the content item specified by the content specifying;
  the portable display device includes a coordinate inputter;
  the information processing system further comprises a playback control display controller configured to display, on the portable display device, a playback control image which is displayed for controlling the playback of the content item being played by the content playback device;
  the playback control display controller is configured to display, on the portable display device, the playback control image together with the playback image when display has been switched by the switching display controller to the playback image being played, and display, on the portable display device, the playback control image together with the user interface image when display has been switched by the switching display controller to the user interface image; and
  the playback controller is configured to perform a playback control on a content item being currently played when a coordinate input is made on the playback control image by the coordinate inputter.

16. A non-transitory computer-readable storage medium having stored thereon an information processing program to be executed by a computer of an information processing apparatus capable of outputting display data to a stationary display device and a portable display device on which a predetermined input can be made by a user,
  the information processing program causing the computer to execute:
    playing a content item to thereby generate a playback image, and displaying the playback image at least on the stationary display device;
    generating a user interface image used for specifying a content item to be played;
    alternatively displaying the playback image being played and the user interface image on the portable display device while a content item is being played; and
    specifying a content item to be played next based on a predetermined input made by the user on the portable display device using the user interface image,
  wherein the specified content item is played next; and
  wherein the information processing program causes the computer to further execute:
  displaying, on the portable display device, a playback control image which is displayed for controlling the playback of the content item being played;
  displaying, on the portable display device, the playback control image together with the playback image when display has been switched to the playback image being played, and displaying, on the portable display device, the playback control image together with the user interface image when display has been switched to the user interface image; and
  performing a playback control on a content item being currently played when a coordinate input is made on the playback control image by coordinate input on the portable display device.

17. A content playback control method to be executed in an information processing system including a stationary display device, and a portable display device on which a predetermined input can be made by a user, the method comprising:
  playing a content item to thereby generate a playback image, and displaying the playback image at least on the stationary display device;
  generating user inter race image used for specifying a content item to be played;
  alternatively displaying the playback image being played and the user interface image on the portable display device while a content item is being played; and
  specifying a content item to be played next based on a predetermined input made by the user on the portable display device using the user interface image;
  displaying, on the portable display device, a playback control image which is displayed for controlling the playback of the content item being played;
  displaying, on the portable display device, the playback control image together with the playback image when display has been switched to the playback image being played, and displaying, on the portable display device, the playback control image together with the user interface image when display has been switched to the user interface image; and
  performing a playback control on a content item being currently played when a coordinate input is made on the playback control image by coordinate input on the portable display device.

* * * * *